US008984604B2

(12) United States Patent
Begley et al.

(10) Patent No.: US 8,984,604 B2
(45) Date of Patent: Mar. 17, 2015

(54) LOCALLY STORED PHISHING COUNTERMEASURE

(75) Inventors: Nicholas Andrew Begley, Caledon East (CA); Herbert Anthony Little, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 229 days.

(21) Appl. No.: 13/102,464

(22) Filed: May 6, 2011

(65) Prior Publication Data

US 2011/0277024 A1 Nov. 10, 2011

Related U.S. Application Data

(60) Provisional application No. 61/332,451, filed on May 7, 2010.

(51) Int. Cl.
| | | |
|---|---|---|
| G06F 7/04 | (2006.01) |
| G06F 15/16 | (2006.01) |
| G06F 17/30 | (2006.01) |
| H04L 29/06 | (2006.01) |
| H04L 29/08 | (2006.01) |
| H04W 12/06 | (2009.01) |

(52) U.S. Cl.
CPC ............... *H04L 67/34* (2013.01); *H04L 63/08* (2013.01); *H04W 12/06* (2013.01); *H04L 67/02* (2013.01)
USPC ............................................................ 726/7

(58) Field of Classification Search
USPC ............ 707/758; 70/14.4; 713/168, 179, 155, 713/175, 172; 726/23, 2, 7, 10; 709/222; 345/592
See application file for complete search history.

(56) References Cited

U.S. PATENT DOCUMENTS

| 7,100,049 B2 | 8/2006 | Gasparini et al. |
| 7,346,775 B2 | 3/2008 | Gasparinl et al. |
| 7,877,784 B2 * | 1/2011 | Chow et al. ........................ 726/2 |
| 8,131,742 B2 * | 3/2012 | Stellhorn et al. ............... 707/758 |
| 2006/0218403 A1 * | 9/2006 | Sauve et al. .................... 713/175 |
| 2006/0288213 A1 * | 12/2006 | Gasparini et al. ............. 713/170 |
| 2007/0070082 A1 * | 3/2007 | Brennan ........................ 345/592 |

(Continued)

FOREIGN PATENT DOCUMENTS

| CA | 2739313 | 11/2011 |
| EP | 2385679 | 11/2011 |
| WO | 2008092263 A1 | 8/2008 |

OTHER PUBLICATIONS

Alsaid, A. et al., "Preventing Phishing Attacks Using Trusted Computing Technology", Information Security Group, Royal Holloway, University of London, 2006.

(Continued)

*Primary Examiner* — Dustin Nguyen
(74) *Attorney, Agent, or Firm* — Integral Intellectual Property Inc.; Miriam Paton; Amy Scouten

(57) ABSTRACT

A system and method for authenticating a resource such as a website or webpage is provided. In response to a script provided with a resource, a verification file is initially generated and stored at a client device. The verification file may be selected or generated with user input. On a subsequent occasion when a resource is accessed by the client device, a script is executed to attempt to retrieve the verification file and display the file at the client device. If the verification file is successfully retrieved and displayed and recognized as the correct verification file, the resource is authenticated.

21 Claims, 12 Drawing Sheets

(56) References Cited

U.S. PATENT DOCUMENTS

| | | | |
|---|---|---|---|
| 2007/0277224 A1* | 11/2007 | Osborn et al. | 726/2 |
| 2008/0034428 A1 | 2/2008 | Bejar et al. | |
| 2008/0127319 A1 | 5/2008 | Galloway et al. | |
| 2008/0168546 A1 | 7/2008 | Almeida | |
| 2008/0201578 A1* | 8/2008 | Drake | 713/172 |
| 2009/0006861 A1 | 1/2009 | Bemmel | |
| 2009/0037997 A1* | 2/2009 | Agbabian et al. | 726/10 |
| 2009/0064327 A1 | 3/2009 | Stukanov | |
| 2009/0077637 A1* | 3/2009 | Santos et al. | 726/5 |
| 2009/0106556 A1* | 4/2009 | Hamid | 713/176 |
| 2009/0106838 A1* | 4/2009 | Clark et al. | 726/23 |
| 2009/0271868 A1 | 10/2009 | Ogawa | |
| 2010/0031022 A1* | 2/2010 | Kramer | 713/155 |
| 2010/0057895 A1* | 3/2010 | Huang | 709/222 |
| 2010/0088513 A1* | 4/2010 | Hunneybell | 713/168 |
| 2011/0093701 A1* | 4/2011 | Etchegoyen | 713/165 |
| 2011/0289331 A1* | 11/2011 | Kobayashi et al. | 713/323 |
| 2012/0221386 A1* | 8/2012 | Netzer et al. | 705/14.4 |

OTHER PUBLICATIONS

Dhamija, R., Tygar, J. D., "The Battle Against Phishing: Dynamic Security Skins", ACM International Conference Proceeding Series—AICPS, 2005, pp. 77-88.

Jackson, C., Barth, a., "Beware of Finer-Grained Origins", In Web 2.0 Security and Privacy, 2008, pp. 1-7.

Karlof, C. K. et al., "Locked cookies: Web authentication security against phishing, pharming, and active attacks", Electrical Engineering and Computer Sciences University of California at Berkeley Technical Report No. UCB/EECS-2007-25, Feb. 7, 2007, pp. 1-32.

Karlof, C. et al., "Dynamic Pharming Attacks and Locked Same-origin Policies for Web Browsers", CCS'07, Oct. 29-Nov. 2, 2007, pp. 58-71.

Ludl, C. et al., "On the Effectiveness of Techniques to Detect Phishing Sites", DIMVA '07 Proceedings of the 4th international conference on Detection of Intrusions and Malware, and Vulnerability Assessment, 2007, pp. 20-39.

Medvet, E., Kirda, E., Kruegel, C., "Visual-Similarity-Based Phishing Detection", SecureComm '08 Proceedings of the 4th international conference on Security and privacy in communication networks, Sep. 22-25, 2008, Art. 22.

Pan, Y., Ding, X., "Anomaly Based Web Phishing Page Detection", Computer Security Applications Conference, Dec. 2006. ACSAC '06. 22nd Annual, pp. 381-392.

Smetters, D. K., Stewart, P., "Breaking out of the Browser to Defend Against Phishing Attacks", Fifth Conference on Email and Anti-Spam (CEAS08), Aug. 21-22.

Wu, M., "Thesis Proposal: Fighting Phishing at the User Interface", MIT. 2006.

Extended Examination Search Report dated Sep. 13, 2011 from EP11165161.8.

Phen-Lan Lin et al., "Graphical Passwords Using Images with Random Tracks of Geometric Shapes", Image and Signal Processing, May 27, 2008, pp. 27-31, XP031286824.

Takeru Inoue et al., "iAuth: HTTP Authentication Framework Integrated into HTML Forms", Advanced Information Networking and Applications Workshops (Waina), 2010 IEEE 24th International Conference, Apr. 20, 2010, pp. 425-430, XP031687158.

Stoimen, "Storing JavaScript objects in html5 localStorage", Stoimen's web log, Feb. 24, 2010, XP000002657142, retrieved from Internet Aug. 18, 2011, URL: http://www.stoimen.com/blog/2010/02/24/storing-javascript-objects-in-html5-localstorage/.

Response. European Application No. 11165161.8. Dated: Nov. 30, 2011.

Exam Report. European Application No. 11165161.8. Dated: May 10, 2013.

Office Action. Canadian Application No. 2,739,313. Dated: Jun. 14, 2013.

Communication under Rule 71(3) EPC. European Patent Application No. 11165161.8. Dated: Mar. 13, 2014.

Response. European Patent Application No. 11165161.8. Dated: Sep. 4, 2013.

Decision to grant a European patent pursuant to Article 97(1) EPC. European Patent Application No. 11165161.8. Dated: Jul. 24, 2014.

Office Action. Canadian Patent Application No. 2,739,313. Dated: Jun. 2, 2014.

* cited by examiner

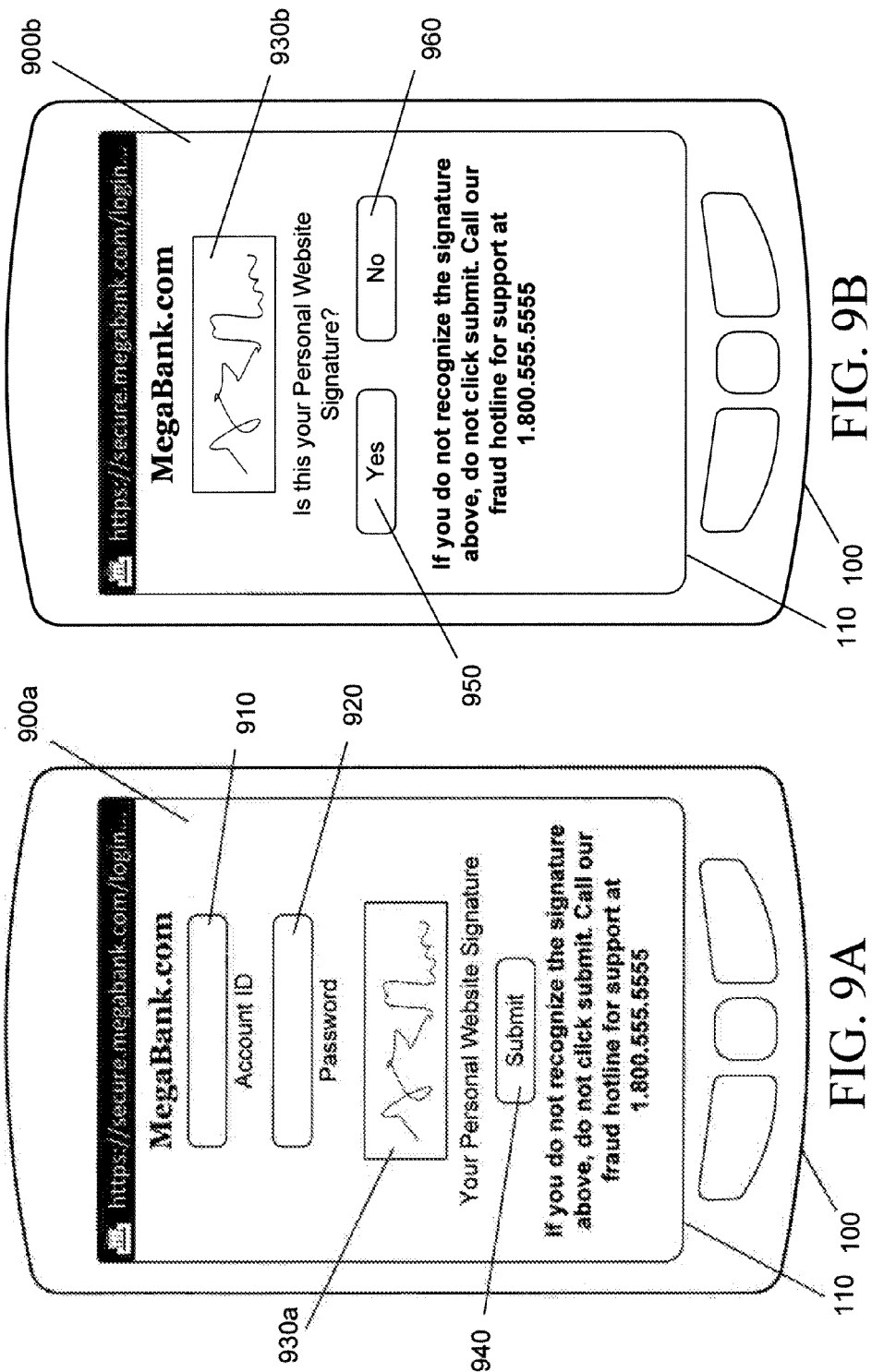

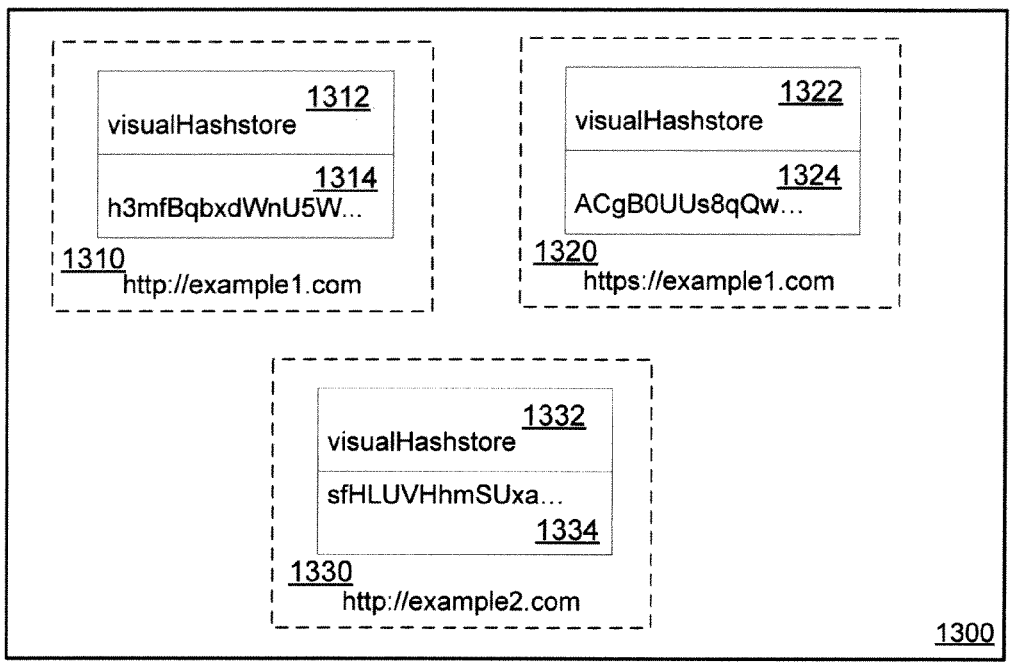
FIG. 13
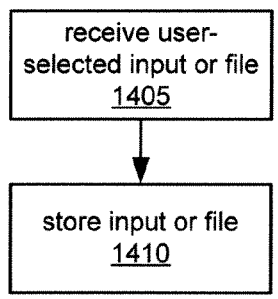
FIG. 14A
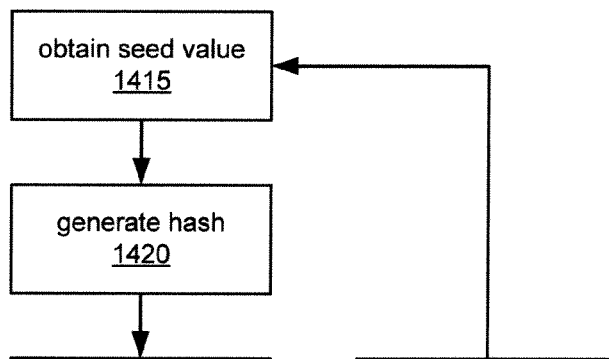
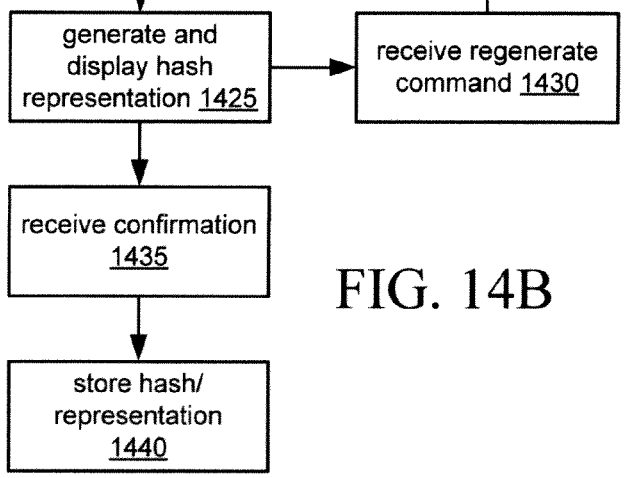
FIG. 14B

US 8,984,604 B2

LOCALLY STORED PHISHING COUNTERMEASURE

CROSS-REFERENCE TO RELATED APPLICATIONS

This application claims priority to U.S. Provisional Application No. 61/332,451 filed on 7 May 2010, the entirety of which is incorporated herein by reference.

BACKGROUND

1. Technical Field

The present application relates generally to computer security and anti-phishing measures.

2. Description of the Related Art

Consumers increasingly rely on online web services for personal, financial, and business-related transactions. Access to these online services frequently requires the user to supply credentials, such as a userid and a password. In a common implementation involving a server system providing the online services and a browser client operating on a user communication device, the user enters the userid and password in form fields presented in a webpage displayed by the browser client, and the userid and password are transmitted to the server system, which validates the userid and password against records at the server system to determine whether access to the services should be granted.

A common type of fraud perpetrated in connection with such services provided over the Internet is "phishing", in which an attacker attempts to gain confidential information, such as the user's credentials, so that the attacker can then access the user's online services. For example, banking services are commonly provided over the Internet over a web portal; users may access the services by providing a userid and password. An attacker who wishes to gain access to a user's bank account and related financial information may create a fraudulent website mimicking the content of a financial institution's legitimate website including any form fields for entry of user credentials, and then direct the user to the fraudulent website. If the user does not detect that the website is indeed fraudulent, the user may enter his or her userid and password, which are then received by the attacker. The attacker may then use these credentials to access the user's account information using the financial institution's legitimate website.

BRIEF DESCRIPTION OF THE DRAWINGS

In drawings which illustrate by way of example only embodiments of the present application.

FIGS. 9A and 9B are examples of graphical user interfaces displayable on a mobile communication device.

FIG. 13 is a block diagram of a local storage component in a client device.

FIGS. 14A and 14B are methods for generating or obtaining a verification file.

DETAILED DESCRIPTION

The embodiments described herein provide phishing countermeasure systems and methods to reduce the likelihood of a successful phishing attack. The following embodiments are described generally in relation to a user communication device or data processing device capable of communication over a network with a service, and in particular over the Internet with an online web service typically accessible via a web server and associated system. The user device may be a personal computer adapted for network communications. It will be appreciated by those skilled in the art, however, that this description is not intended to limit the scope of the described embodiments to personal computers. The methods and systems described herein may be applied to any appropriate communication or data processing device enabled for communications over fixed or wireless links, whether portable or not, including without limitation cellular phones, smartphones, wireless organizers, personal digital assistants, desktop computers, terminals, laptops, tablets, handheld wireless communication devices, wirelessly-enabled notebook computers and the like. For ease of reference, the device is generally referred to as a "client device" below.

Further, the embodiments described herein are generally described in the context of resources delivered to and displayed at a client device. The resources may generally be webpage documents or other structured documents, for example authored in hypertext markup language (HTML) or in another structured markup language. The resources may comprise or be rendered in conjunction with scripts, dynamic content, presentation markup, style sheets, or other programming content that is processed within the environment provided by a client application executing on the client device. The client application may be a client browser application or other content viewer for displaying the content of the resource. The construction of HTML web pages and other structured content using known structural and presentation standards such as HTML 4.01, XHTML 1.0, HTML 5, DOM Levels 1 through 3, and CSS Levels 1 through 3, published by the World Wide Web Consortium (W3C) at w3.org, will be known to those skilled in the art. The resources may comprise or be associated with elements such as JavaScript published by the Mozilla Foundation, Mountain View, Calif., www.mozilla.org; Adobe Flash technologies from Adobe Systems Incorporated, San Jose, Calif.; dynamic HTML technology, widgets, modules, code snippets, and the like, which may be delivered together with the resource to the client device, or which alternatively may be downloadable separately by the client application for use with the resource. The selection and implementation of these and other suitable existing and future structural or presentation standards, various elements, scripting or programming languages and their extensions, will be known to those of skill in the art.

Figure 1:
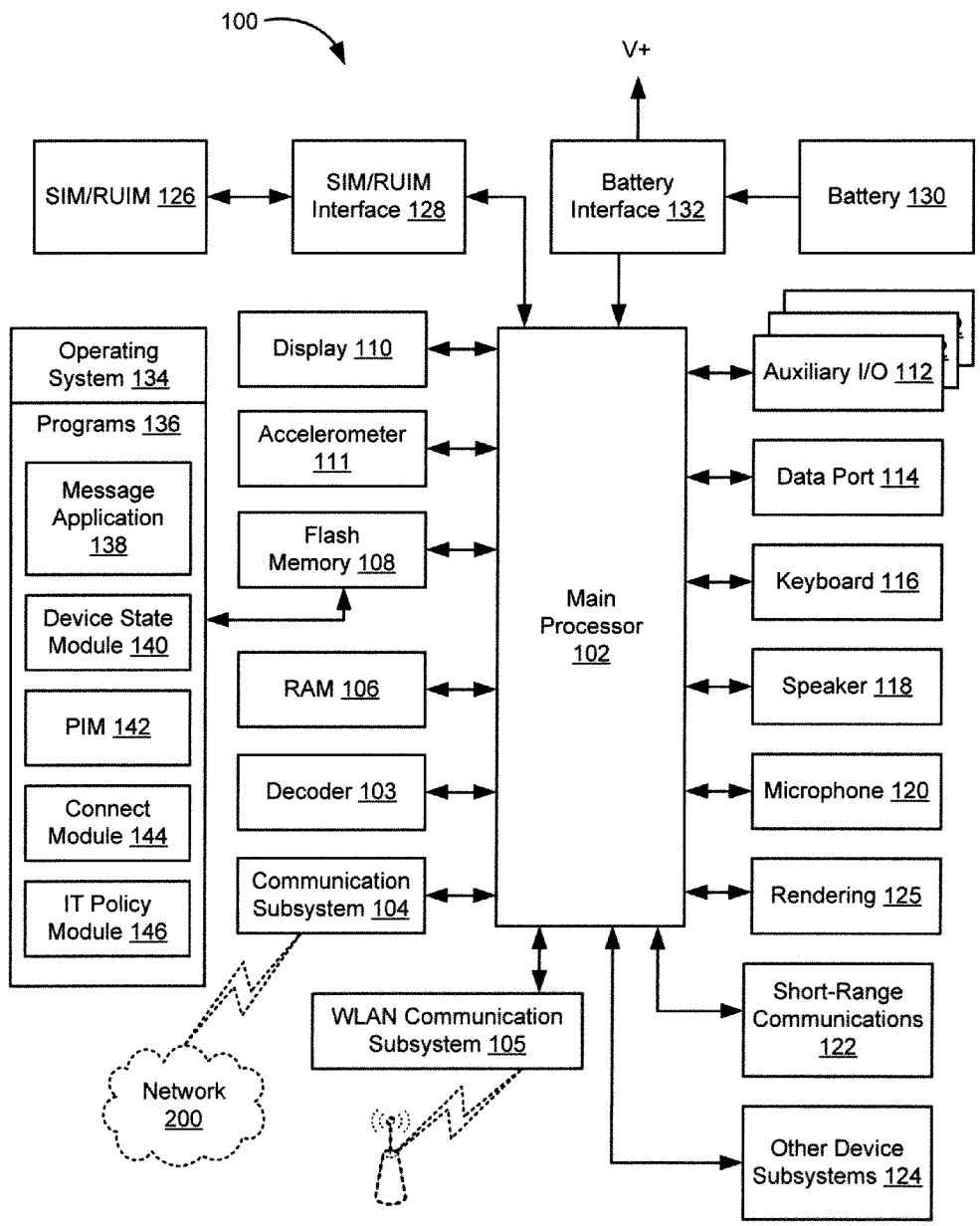
FIG. 1 is a block diagram of an embodiment of a mobile device.
Figure 2:
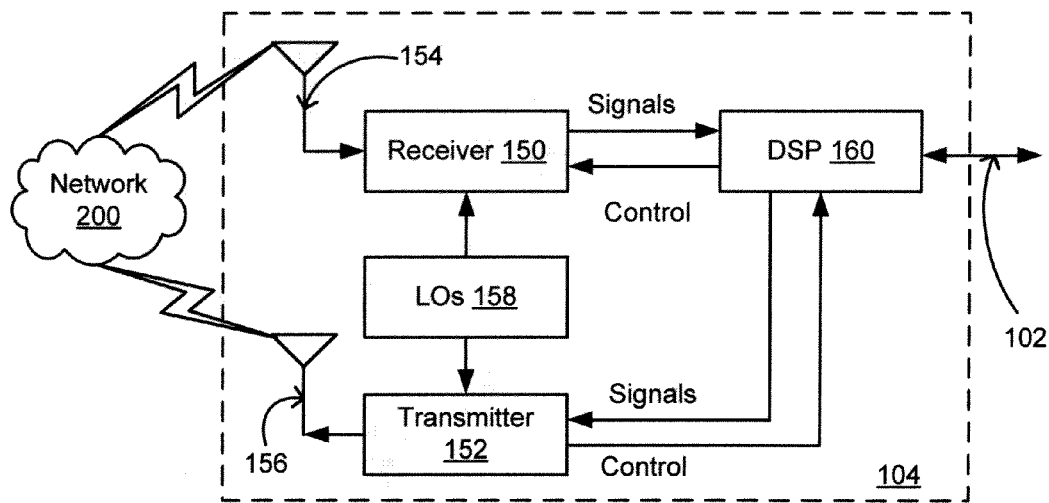
FIG. 2 is a block diagram of an embodiment of a communication subsystem component of the mobile device of FIG. 1.
Figure 3:
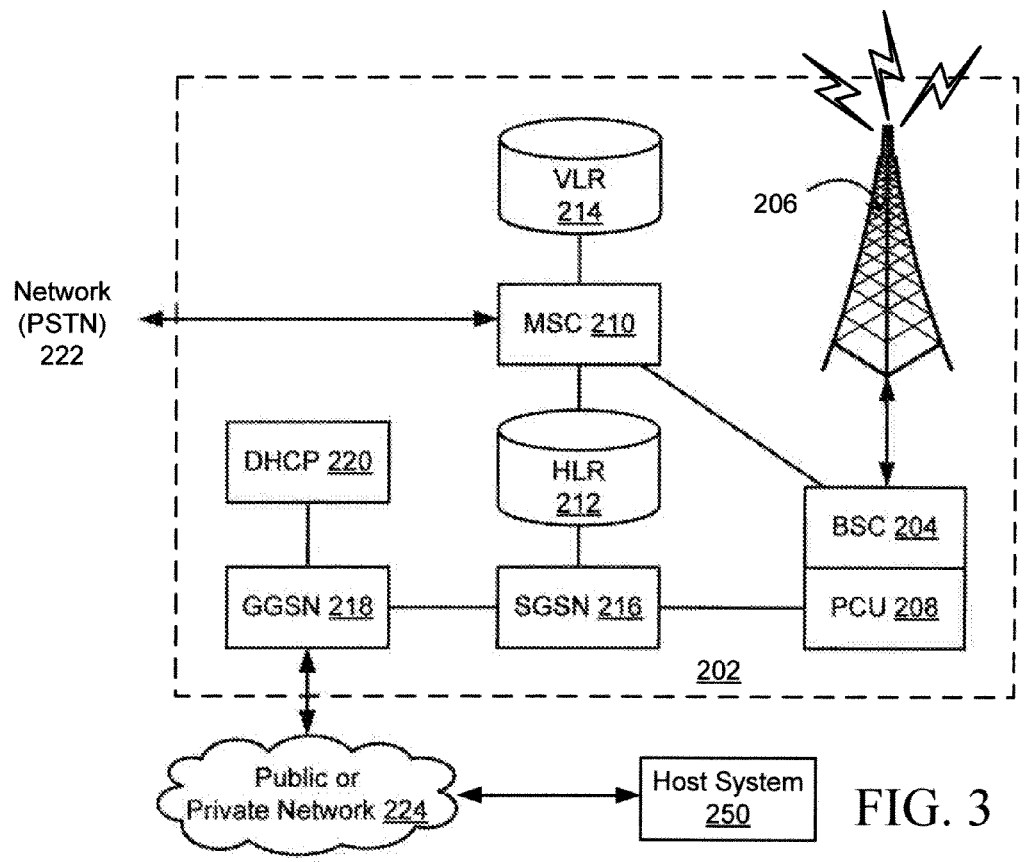
FIG. 3 is an exemplary block diagram of a node of a wireless network for use with the mobile device of FIG. 1.
Figure 4:
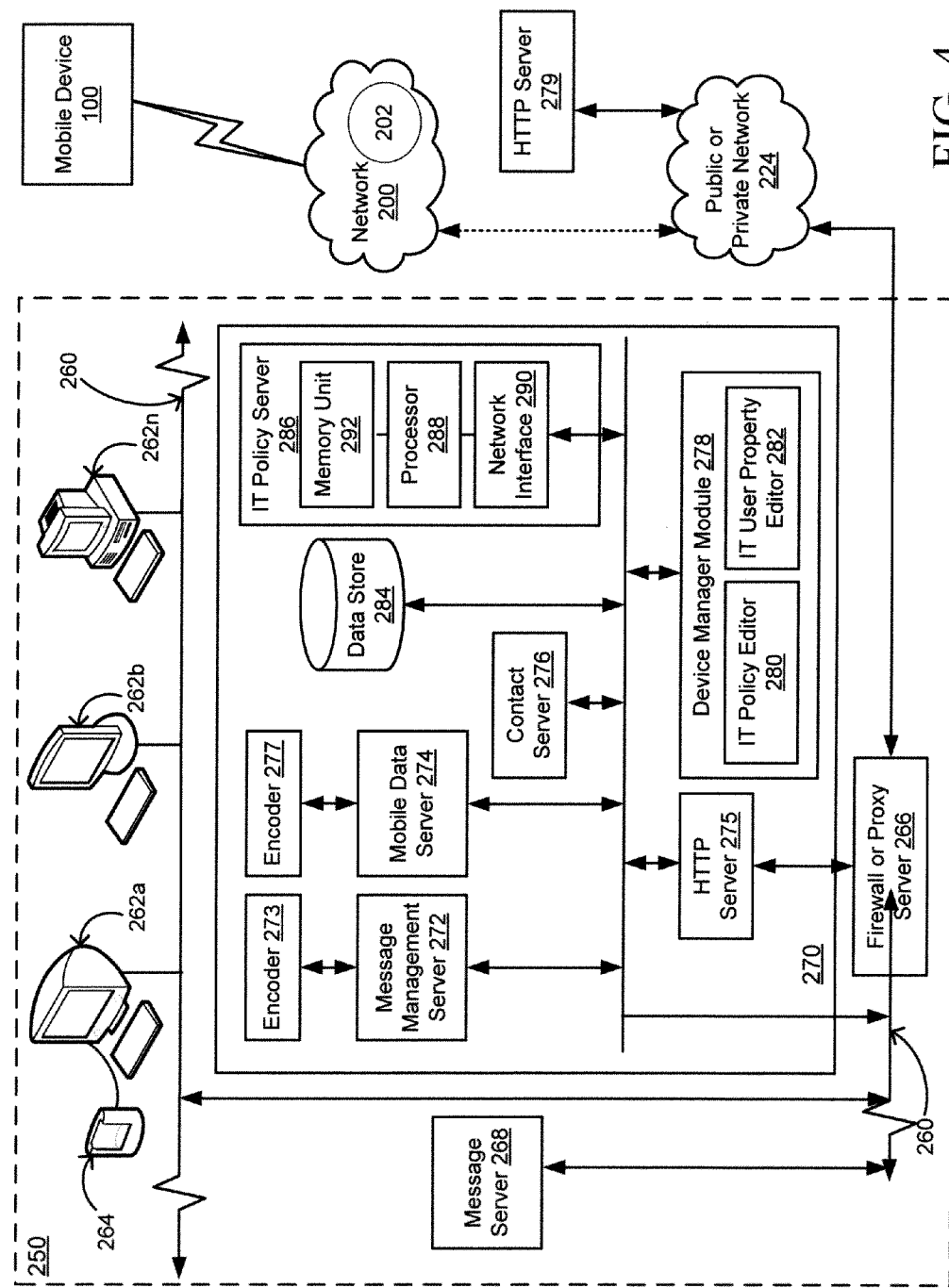
FIG. 4 is a block diagram illustrating components of a host system in one exemplary configuration for use with the wireless network of FIG. 3 and the mobile device of FIG. 1.

The embodiments described herein may be implemented on a client device that is a mobile communication device, such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities. Throughout the specification, terms such as "may" and "can" are used interchangeably and use of any particular term should not be construed as limiting the scope or requiring experimentation to implement the claimed subject matter or embodiments described herein.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. The communication device may also be provided with an accelerometer 111, which may be used to detect gravity- or motion-induced forces and their direction. Detection of such forces applied to the device 100 may be processed to determine a response of the device 100, such as an orientation of a graphical user interface displayed on the display assembly 110 in response to a determination of the current orientation of which the device 100.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) or another suitable identity module to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's communication device 100 is situated on a LAN connection. The cradle 264 for the communication device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262a to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262a-262n are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection may be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262a can request the e-mail messages associated with that user's account stored on the data store associated with the message server 268. These messages are then retrieved from the data store and stored locally on the computer 262a. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as an File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

A typical phishing attack is characterized by an attempt to fool a user into disclosing confidential information, such as login credentials, to the attacker. In a common scenario, a user may be registered with an online service, such as a financial institution's online banking service. The service may require the user to supply both a userid (in the case of a banking service, the userid may be a bank card number) and a password. To access the service, the user invokes a client browser application, which requests the online service's login page. When the login page is displayed in the client browser, the user enters the userid and password in form fields within the login page and actuates a "submit" function, and these credentials are then transmitted to the web server of the online service. The online service then verifies the received data to authenticate the user. If the data is authenticated, then access to online service functions is granted to the client browser.

An attacker may subvert this process by interposing its own communications to the user. The attacker may set up a fraudulent website with a domain name similar to the legitimate online service's domain name. For example the legitimate domain name may be "onlinebanking.com", whereas the attacker's domain name may comprise a common typographic error or a different alphanumeric character that is similar in appearance to a character in the legitimate domain name, such as "onlinbanking.com" or "onlinebanking.com". Webpages on the attacker's site may mimic the content of the legitimate site's webpages, by replicating logos and copy, and other elements from the legitimate webpages. But for the different Uniform Resource Indicator (URI) associated with them, the attacker's webpages may appear to the user to be the legitimate pages. The attacker would then set up a webpage to mimic the legitimate login page, so that users who submitted their userids and passwords via the attacker's login page would actually provide their credentials to the attacker rather than the legitimate service. The attacker could then use those credentials itself to gain access to the legitimate service in the user's name, and make use of the services for its own gain and/or to harm the user. For example, if the online service is a banking service, the attacker could then log into the online service with the user's credentials, and transfer funds out of the user's account and into an account associated with the attacker.

While the attacker may rely on chance to capitalize on a user's typographical error in typing in an address in the client browser's address bar, attackers may sent fraudulent communications to the user to attract the user to the fraudulent website. A common device is a phishing e-mail, ostensibly sent in the name of the legitimate service, advising the user that it is necessary to follow a hyperlink provided in the e-mail to log into a website to verify information. The hyperlink is, of course, a link to the fraudulent website. Thus, the attacker generally relies on deceiving the user regarding the source of the e-mail and the legitimacy of the website to gain access to the user's credentials. Unsophisticated users may not notice the difference between the URIs of the attacker's webpages and the URIs of the legitimate service's webpages, and may not realize that a website is fraudulent.

The information sought by the attacker need not be limited to credentials such as userids, passwords and account numbers; the information can be other types of confidential or quasi-confidential information typically used by the user to establish his or her identity to others, including personal habits, mother's maiden name, and the like.

Countermeasures against phishing attacks may be implemented at a number of stages of the process. A countermeasure may involve prevention—preventing potential phishing communications from reaching the user at all. One such countermeasure is the implementation of a "blacklist", which identifies suspected phishing attackers (for example, by IP address or domain name). The blacklist is provided to the client browser or another network element between the user and the attacker, such as a firewall at the periphery of the user's home network. Communications from blacklisted sources are then blocked by the client browser or firewall, or else if such communications are allowed through, a warning may be displayed to the user to warn that the source of the communication may be malicious. Conversely, a "whitelist" can be established to expressly list those IP addresses, domain names, or uniform resource indicators that have been determined to be safe or authentic. The client's browser is permitted to communicate only with those sources identified in the whitelist. Another prevention countermeasure is the filtering of e-mails and other messages that are suspected of being fraudulent before they are viewed by the user. Blacklists, whitelists and filters, however, generally require updating to keep up with new phishing activities.

Another type of countermeasure alerts the user after the fact regarding transactions carried out with the user's online account. After a transaction, such as a bank transaction, is carried out online using the user's credentials, a message is sent out-of-band to the user confirming that the transaction had taken place. The out-of-band message is sent over a different channel than the online communications channel used to carry out the transaction, or using a different user contact address than that associated with the online account, to minimize the risk that the attacker will have gained control of the out-of-band communications. For example, after a funds transfer is carried out, the financial institution may transmit an SMS message to the user confirming the transfer. If the user reviews the SMS message and realizes that he or she did not order that transfer, the user can then take steps to have the transaction reversed. However, this countermeasure takes place after the fraudulent activity has occurred, requires the existence of a second communication mechanism or contact address, and is actually remedial in nature, as it requires the user to review the confirmation message after the event and take action should it be determined that the transaction was unauthorized. This countermeasure also fails to address the circumstance where the user intended to effect a transaction, but was misled into carrying out the transaction via a fraudulent website; in that case, no confirmation message will be received by the user.

Other countermeasures are addressed to the authentication communications that take place between a user's client browser and the online service. The user authentication process can be enhanced with additional mechanisms to verify that the correct parties—user and online service—are communicating with each other. For example, one countermeasure makes use of two-factor authentication, in which the user carries a separate hardware token configured to generate one-time use access codes, for example based on a seed value or a nonce. When the user wishes to access the online service, the one-time use access code is input with a userid. The algorithm for generating the codes is synchronized with an algorithm implemented in the online system, so the online service can determine whether the received access code is correct. Because the one-time code requires possession of a hardware token, there is increased assurance that the party seeking access to the online system is the legitimate user, and not an attacker.

As another example, a multiple login process or a process making use of added personal entropy may be implemented. Not only may the user be required to select or be assigned a userid and a password, but the user may also be required to select or define further information that is not necessarily unique, but is personal to that user. This further information is provided to the online service. The next time the user attempts to log in with the userid and password, the online service will verify the userid and password, then query the user concerning the further personal information. If the user answers correctly or confirms the personal information, then the user and the online service are provided with some assurance that the legitimate online service and legitimate user have been contacted.

For example, the user may be required to answer one or more security questions, which may or may not be predefined questions, with information that is known personally by the user (e.g., "what is your pet's name?"). When the user subsequently attempts to log in, the online service may verify the userid and password, then respond with a further query based on one of the security questions. The user must answer the question correctly to proceed. In some embodiments, the user is also required to register their primary computer or primary communication device with the service. If the user attempts to log in from the primary computer, the online service may grant access to its services once the userid and password have been verified. If the user attempts to log in from a different device, then the online service may pose one or more of the security questions to obtain a correct response before granting access.

In a variant, at the time of registration with an online service the user may define special information (such as a picture or a passphrase) to be stored by the online service and displayed to the user by the online service when the user attempts to log in. When the user subsequently attempts to log in, partway through the authentication process the online service retrieves and provides the special information to the user for confirmation. If the user is satisfied that the special information is correct, then the user proceeds with the balance of the authentication process.

These countermeasures directed to the authentication process function as phishing countermeasures for the most part because they are capable of confirming that the correct user, and not an attacker, has accessed the online service with the user's credentials. However, it is still possible that an attacker may have already obtained the user's credentials. Further, these countermeasures are still vulnerable to man-in-the-middle or eavesdropping attack.

Figure 5:
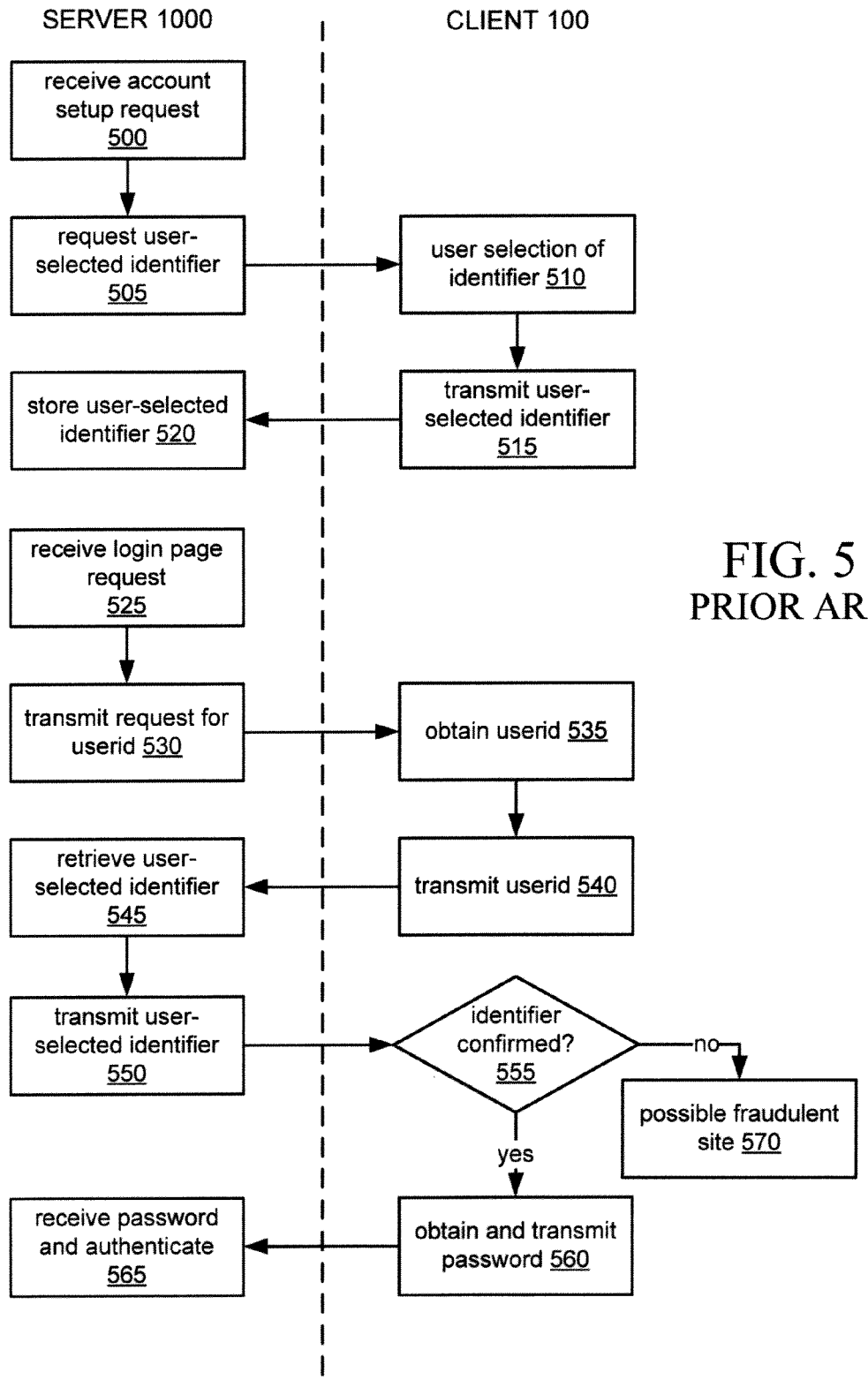
FIG. 5 is a flowchart of a prior art method for authenticating a user at a website.

FIG. 5 illustrates a prior art anti-phishing process that may be implemented for an online service. Initially, there is a first account set up phase. At 500 the online service receives an account set-up request. This request may be received over the Internet or over another communication network from the user's device; however, this initial phase can be carried out in an out-of-band manner. For example, when a user sets up an account and applies for online access at a financial institution, the initial setup may be carried out over the telephone or in person at a financial institution branch. In FIG. 5, the steps are described as being carried out by a server system for the online service and a client browser for the user, although these steps could be carried out in person. At 505, the online service requests a user-selected identifier. For example, the online service may retrieve from a data repository a set of hundreds, or thousands, of images. The user may be required to select at 510 one of the images as a personal identifier. Alternatively, the user may be requested to select an image file from the user's own computer. At 515, the user's client browser transmits a response to the online service indicating which image of the online service's collection has been selected, or alternatively the user's own image is uploaded to the online service. At 520, the online service stores the identifier of the image selected by the user, or stores the image received from the client browser, in association with the user's information.

Subsequently, the user may wish to log into the online service to transact business. At 525, the online service receives a request for a login page. This request may be received from the user's client browser. At 530, the online service responds by transmitting the page requested, which may request the user enter a userid in a form field in the page. At 535, the user's device 100 receives the userid input by the user, which may be input into the form field, and at 540 the userid is transmitted to the online service.

Next, the online service uses the received userid to retrieve the user-selected identifier at 545. This user-selected identifier is then presented to the user for confirmation at 550, for example by transmitting it as an object in a further webpage to be rendered in the client browser. The user, having received the identifier included in the further webpage, may then determine at 555 whether the identifier is the correct one. If it is not, then the source of the further webpage may be fraudulent; the user thus may be alerted to the potential phishing attempt and may know to cease providing information to this online service until its legitimacy has been confirmed. If the identifier is the correct one, then at 560 the client device 100 receives the password from the user, and transmits the password to the online service, which then completes the authentication of the user.

The foregoing process provides for a form of confirmation by the user that the correct online service has been accessed, based on the premise that only the legitimate online service should know which image the user had selected. Similarly, the online service may be said to have confirmed that the legitimate user supplied the userid and password, since presumably only the legitimate user should know which image was selected. This process remains vulnerable, though, because an attacker may interpose itself between the user and the online service after the initial account setup phase had been completed. As described above, the user may be subsequently misdirected to the attacker's website, which may mimic the online service's login page requesting the user's userid at 530. At 540, then, the client device 100 may transmit the userid to the fraudulent website. The attacker may then use the userid to complete the communication with the legitimate online service between steps 540 and 545 by commencing the login procedure at the legitimate online service with the user's userid. The online service, having received the userid, would then retrieve the user-selected identifier and provide it to the attacker. The attacker in turn may then present the identifier to the client device 100, where the user may confirm its accuracy at 555, and cause the password to be transmitted at 560 to the attacker. Thus, the attacker may still obtain the user's credentials, as well as gain knowledge of the user's selected identifier.

The particular vulnerability described above is due to the fact that communications between the client device and the online service may be intercepted, and completion of the authentication process requires the online service's server 1000 and the client device 100 to exchange user-specific data—not only the userid and password, but also the user-selected identifier. Additional security steps may be taken to discourage interception; for example, communications between the server 1000 and client device 100 may take place in an encrypted session, for example using cookies, or over an encrypted channel, for example using the Transport Layer Security defined in RFC 5246, published by the Internet Engineering Task Force, or using its predecessor Secure Socket Layer protocol. While such encryption mechanisms may be employed for particularly sensitive transactions, such as the financial transactions mentioned above, not every online transaction will make use of encryption protocols to protect communications between the server and client. The use of encryption typically requires that at least one of the server or the client be in possession of a digital certificate, and thus adds to the general overhead cost of communications since the certificate is usually checked to ensure its validity and provenance, and since every communication is thereafter encrypted. Even if a required certificate is not available or is expired, the user of the client device 100 may not appreciate the significance of the missing or invalid certificate.

Figure 6:
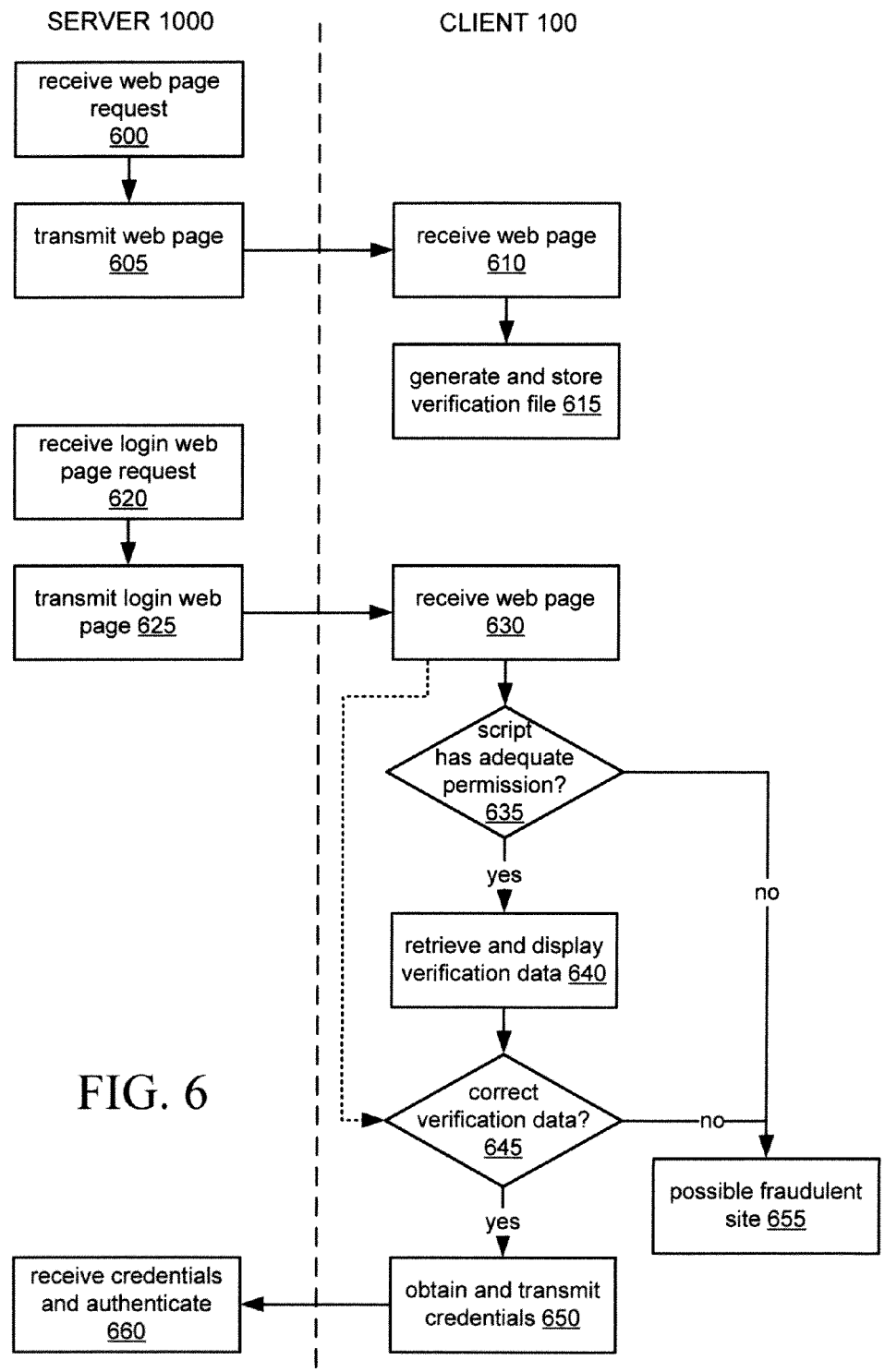
FIG. 6 is a flowchart of a method for verifying a resource provided by a server.

Therefore, in a further embodiment, a process is implemented in which a user-selected identifier, or verification file, is used to assist in the verification of the legitimacy of an online service's website, but the verification file is not transmitted between the server 1000 and the client device 100. An overview of this process is illustrated in FIG. 6. At an initial stage, at 600 the server 1000 for the online service receives a request for a webpage or other resource from the client device 100. The server transmits the resource in response to the request at 605. The resource may be an initial account setup webpage, a login page, or any other resource served from the online service's server 1000. At 610, the client device 100 receives the resource, renders and displays it using a client browser or other viewing application in a display at the client device 100.

In this embodiment, the resource received from the server 1000 may be configured to include a script for generating and storing verification data in a verification file at the client device 100, obtaining a verification file already stored at the client device 100, or both. For example, if the resource is a webpage, the webpage may contain a javascript or other script to be executed automatically when the webpage is rendered in a client browser application. At 615, the script is executed locally at the client device 100, optionally with input received from the user of the client device 100, thus causing new verification data to be generated and presented to the user, or alternatively identifying verification data already available at the client device 100. The verification data is then stored as a verification file locally in memory at the client device 100 in association with information regarding the origin of the resource, such as its URI or a portion thereof. Subsequently, the local storage or the client browser or viewer may be configured to restrict access to the verification file only to requestors or processes identified as originating from the same originating host as the script or resource that was received from the server 1000 at 610.

When the online service's website is again accessed from the client device 100, a request for a resource, such as a login page, is received at the server 1000 at step 620. At 625, the server 1000 transmits the resource to the client device 100. At 630, the client device 100 receives the resource. While the resource received at the client device 100 at 630 from the server 1000 can be identical to the resource originally received at 610, in some embodiments the format or content of the subsequent resource received at 630 may be altered from the format or content of the original resource received at 610. In the case of a webpage, different objects may be embedded in the subsequently received webpage, or its layout may be altered. For example, the server 1000 may transmit differently formatted versions of the same resource (such as a webpage) according to the display capabilities, configuration, or type of browser or viewer application executing on the client device. The request for the resource transmitted from the client device 100 can include an identifier of the format type required, or of the client device or browser type. In addition or alternatively, the resource may be embedded or configured to include custom or dynamically inserted information; accordingly, the subsequently received resource may differ from the originally received resource. Notwithstanding these possible differences, however, the resource is configured to also retrieve a verification file previously stored at the client device 100, for example by including a script for retrieving the verification file. If a script is included in the resource, at 635 a determination is made whether the script has adequate permission to execute and to access the local storage at the client device 100. As noted above, the local storage in which the verification file is stored may restrict access to the verification file to only those processes that originated from the same source as the original webpage or resource at 605. If the script is not permitted to execute or to access the verification file, the cause may be that the origin of the script or the resource received at 630 is not from the originating source server 1000. Accordingly, the resource received at 630 may be identified as potentially fraudulent at 655 because the verification file is not retrievable. The identification of the resource as potentially fraudulent may be made upon determination that the verification file, or data comprised in the verification file, has not been rendered for display on the device 100. Optionally, if retrieval or display fails, a warning may be displayed to the user that the legitimacy or authenticity of the resource being displayed is doubtful.

If the resource or its script is permitted to execute and access the local storage, then at 640 an attempt is made to retrieve the verification file from the local storage, and to present the verification file for the user's review. If the resource is a webpage served from a server 1000 that is rendered and presented using a client browser application at the client device 100, the retrieved verification file may be rendered and presented either within the webpage currently being displayed, or alternatively in a separate window in the client device display 110. The data that is presented need not be the verification file itself; for example, the data stored in the verification file may be used to generate a further representation, such as an image, text string, sound, and the like, which is then presented via an output interface at the device 100. At 645 a determination is made whether the correct verification file, or data comprised therein, has been retrieved and presented. This determination may be made visually by the user, although the determination may be made by other means, as discussed below. In an alternate method, the resource contains a direct link or reference to the stored verification file, and upon receipt at the client device 100, it is rendered with any referenced objects, and the browser or other application attempts to retrieve the verification file without actual execution of a script so that the verification data can be rendered for presentation at the device. This is reflected by the dashed arrow shown in FIG. 6.

If it is determined that the correct verification file has been displayed, for example as a result of visual verification by the user determining that the verification data as rendered matches an expected rendering based on a previous viewing of the verification data, then the resource may be deemed authenticated, and at 650 the client device 100 may receive the user's credentials, which are then transmitted to the server 1000 for authentication at 660. If, however, the user finds that the verification file displayed is not or does not appear to be the same as the verification file generated previously, then the user is alerted to the possibility that the resource delivered at 630 is potentially fraudulent 655.

Figure 7:
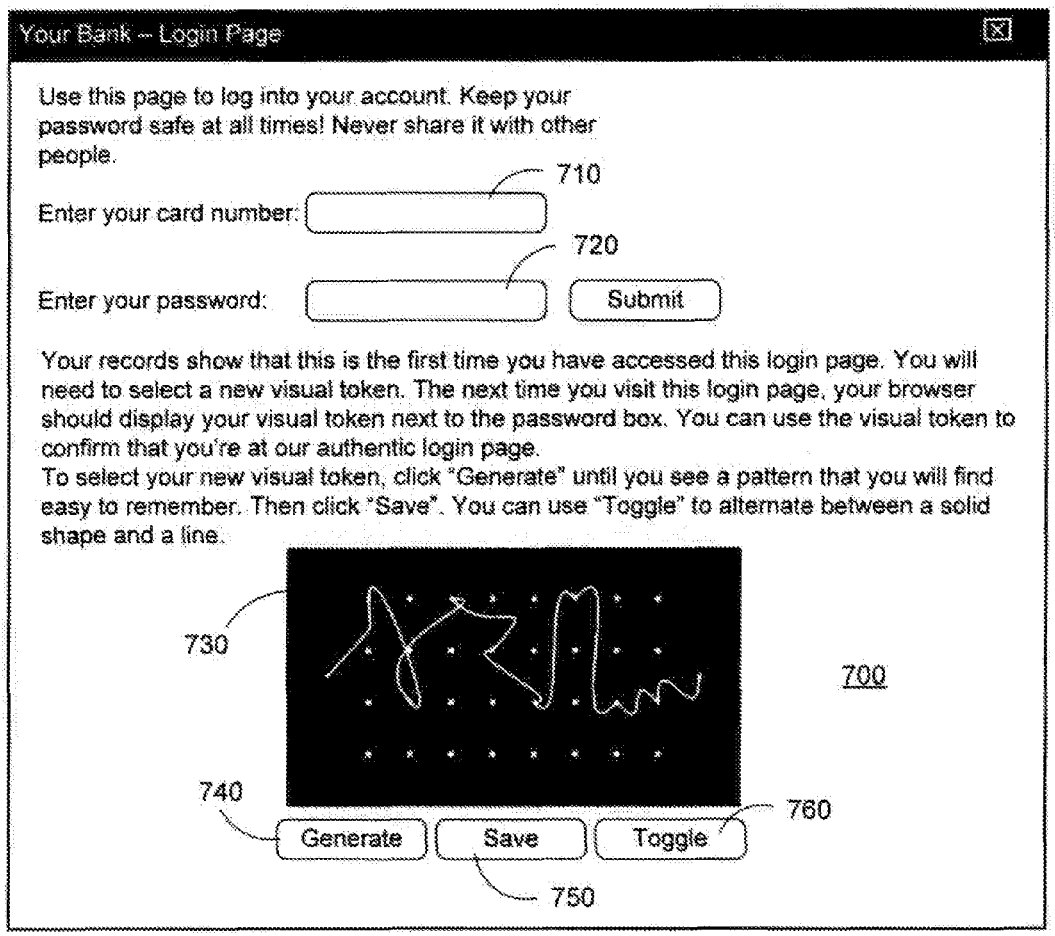
FIG. 7 is an illustration of a webpage displaying a visual hash image.

FIGS. 7 and 8 illustrate sample resources that may be delivered from a legitimate server 1000 and viewed at the client device 100 in accordance with the process of FIG. 6. The displayed resource 700 of FIG. 7 is an example of a login webpage that may be displayed in a client browsing application at a client device 100. The login webpage may include webpage elements for user input, such as fields for entry of user credentials, shown here as a card number 710 and a password 720. However, in accordance with steps 610 and 615 described above, the webpage 700 may also display an interface for generating verification data or selecting an existing verification file. In this example, the verification data or file is an image comprising or represented by a visual hash 730. The generation of verification files comprising visual hashes is described in further detail below. In this webpage 700, options for generating and saving the visual hash may be provided. When the webpage is initially rendered for display at the client device 100, a script in the webpage may be executed to generate an initial visual hash image 730. The generation of the visual hash image is carried out locally, at the client device 100, rather than at the server 1000. Thus, the verification data, which in this example is the visual hash image 730, only exists at the client device 100, and has not been communicated from the server 1000 and the client device 100, or vice versa. This verification data may then be saved to the local storage of the client device 100, optionally with instructions to the user to memorize some or all of the verification data, as it is presented to the user, for future reference. Local storage at the client device 100, i.e., permanent or quasi-permanent storage, is selected for storage of the verification data so as to persist the verification data across sessions and device resets. If desired, the user may then subsequently submit his or her credentials to the server 1000 via the input fields 810, 820.

Figure 15B:
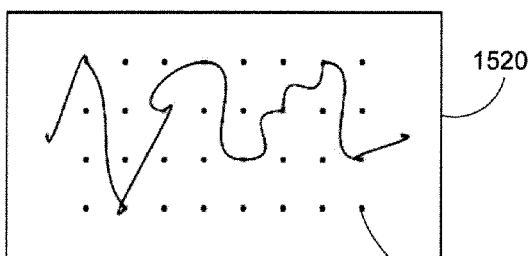
Figure 15C:
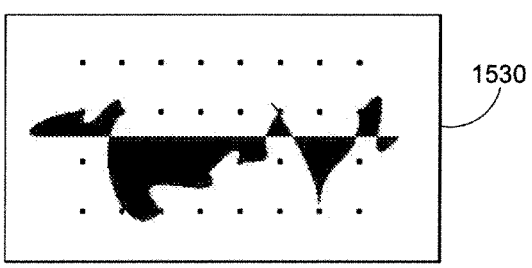
Figure 16C:
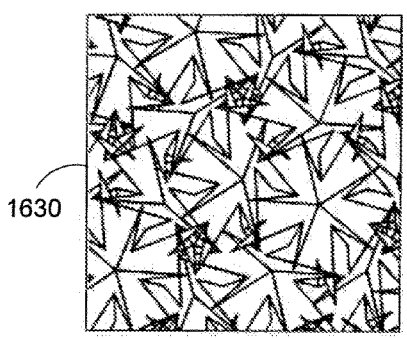
Figure 15D:
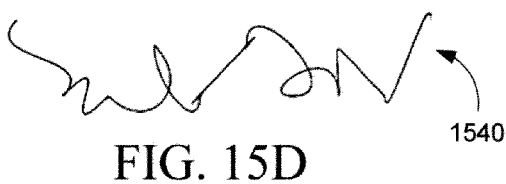

In this embodiment, an option to regenerate the visual hash image 730 may be provided. Actuation of the "generate" button 740 by the user may cause the script to re-execute and generate a new visual hash image 730. The user may thus repeatedly generate new visual hash images 730 until an appropriate image, that the user considers to be easy to memorize, is displayed. Once a particular visual hash image 730 has been settled on, the image may be saved to the local storage. In this embodiment, a "save" button 750 is provided, and actuation of this button may cause the script to save the currently displayed visual hash image 730 to local storage. The "toggle" button 760 may be actuated to invoke a function to switch the appearance of the visual hash image 730 between a line, as shown in FIG. 7, and a filled-in shape, as shown in FIG. 15C.

Figure 8A:
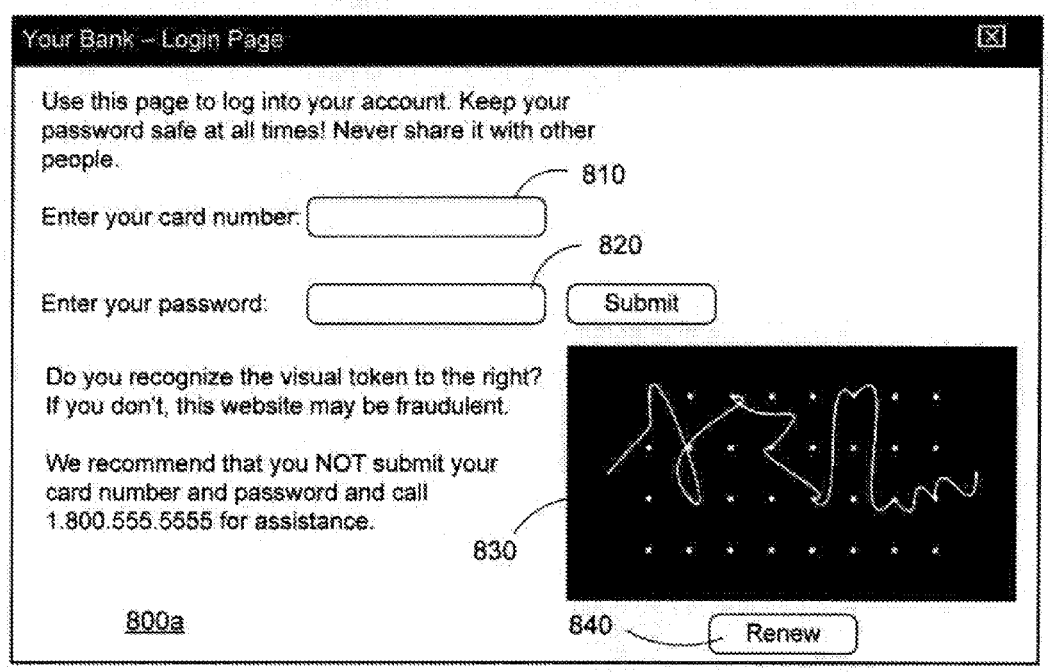
FIGS. 8A and 8B are further illustrations of webpages.
Figure 8B:
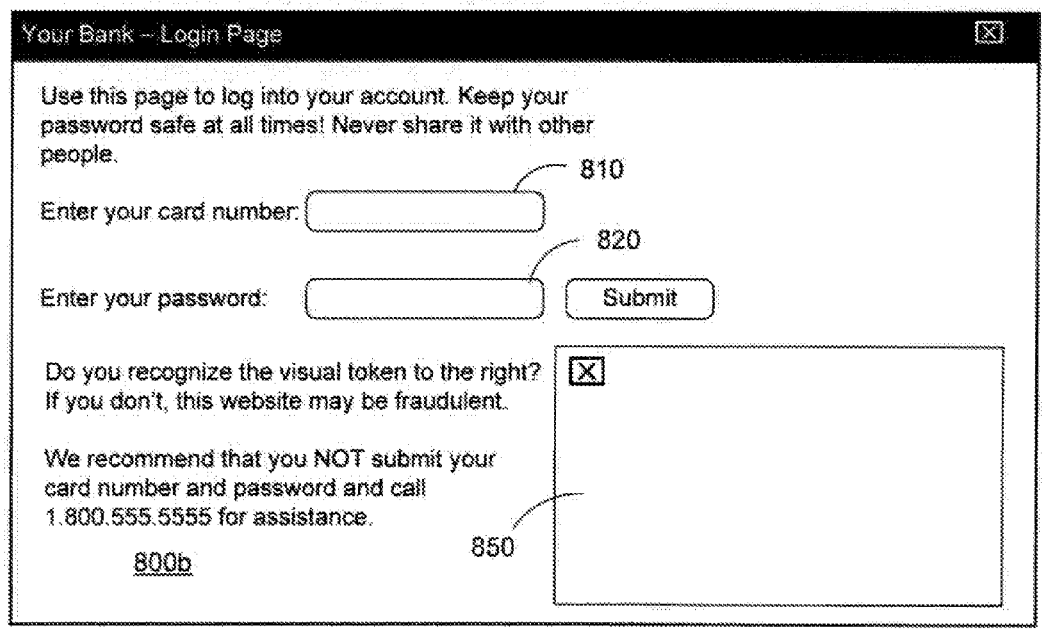

Once the visual hash image 730 has been generated and saved, in a subsequent "visit" to the online service, a visual hash image is used to assist the user in verifying the authenticity of the resources delivered to the client device 100. The webpage 800a of FIG. 8A is an example of a resource that may be delivered to the client device 100 in accordance with step 630 of FIG. 6. The webpage 800a may again be a login page, with fields 810, 820 for inputting user credentials such as card number and password, as in FIG. 7. In addition to these fields, the webpage 800a may include a script for retrieving a verification file from the local storage of the client device 100. As explained above, the local storage and/or the client browsing application at the client device 100 may be configured to only permit access to the verification file to those resources and scripts originating from the same source or host as the resource or script that caused the verification file to be stored in the local storage initially. Thus, in this case, since the origin of the webpage 800a and its script is the same as the origin of the webpage 700, the script from the webpage 800a may be granted permission to access the local storage and retrieve the verification file stored there, which in this case is the image 830. The image 830 is then displayed in the webpage 800a. To increase the probability that the user will see and inspect the image 830, it may be displayed proximate to the password field 820 or to the "submit" button or other user interface element used to initiate an instruction to transmit the input user credentials to the server 1000. The user can then inspect the image 830, and if the image matches the image that the user had previously selected, then the user is provided with some assurance that the origin of the webpage 800a is authentic or legitimate, since it matches the origin of the previously accessed webpage 700.

In this example, the webpage 800a provides an option for regenerating or redefining the verification data. Actuation of the "renew" button 840 may invoke a script included in the webpage 800a for generating a new visual hash image, as described above.

Thus, the process illustrated in FIGS. 6 to 8A provides a means for a user to verify that the webpages or other resource subsequently received at the client device 100 from an online service are in fact from the original source for which the verification file was originally generated and saved, as only the scripts or resources from that original source are permitted to access the local storage to obtain the verification file. If an attacker constructed a website spoofing the legitimate online service's website, the attacker may replicate the webpages and other resources from the legitimate server 1000. These replicated resources could include the scripts contained in the legitimate pages from the server 1000; however, even if the scripts were the same, they would not be granted access to the local storage at the client device 100 to retrieve and display the image 830. FIG. 8B provides an example of a webpage 800b received from an attacker's server and which may be rendered and displayed at a client device 100. In this example, even though the attacker's resource may have included a script intended to access the local storage at the client device 100 and retrieve the verification file, access to the verification file stored in association with the authentic online source was denied because the source of the attacker's server is not the same as the source of the original resource 700. Accordingly, in this example an empty box or an error message 850 is displayed in the webpage 800b, thus signifying to the user that the webpage 800b may not be legitimate, i.e. that it may be a phishing attempt. Although the attacker may also provide a spoofed verification file for rendering and display in the webpage 800b, the verification data displayed to the user would likely be different than the data that the user had previously selected and memorized, as the attacker would not have had access to the correct verification data stored at the client device 100.

FIGS. 9A and 9B provide an example of an implementation at a mobile communication device 100 accessing a third-party website. It will, of course, by understood by those skilled in the art that these embodiments need not be restricted to a smartphone form factor or a portrait orientation, or to a web server-client arrangement. In FIG. 9A, a graphical user interface 900a is displayed in the display 110 of the device 100, representing a rendering of a resource such as a webpage served from an online banking or payment service. This user interface 900a includes user interface elements 910, 920 for user input of an account identifier and password, respectively. The account identifier can include any one of an account number, account card number, userid, or other user or account indicator. The password can be a conventional alphanumeric string, personal identification number, passphrase, and the like. In this embodiment, the resource rendered for display in the graphical user interface 900a also contains script or other code which, when executed by the browser executing at the device 100, attempts to retrieve a verification file from local storage for rendering and display at 930a, generally as described above. The verification data here is rendered as a graphic above and in close proximity to the user interface element 940 (a "submit" button in the example of FIG. 9A) that can be actuated by the user to initiate submission of the account identifier and password to the originator of the resource (i.e., the server 1000).

If the user makes use of a navigation input system such as a trackpad, trackball, scroll wheel, or the like to select the various user interface elements in the graphical user interface 900a for input or for actuation, it is likely that the user will be able to see focus move (for example, though visual highlighting or outlining) from the elements 910, 920 to the submit button 940 in response to a scroll command invoked using the navigation input system. This may increase the likelihood that the user's attention will be drawn to the graphic 930a. The graphic 930a itself could be rendered in the graphical user interface 900a so that it, too, is capable of gaining focus. Thus, as focus moves downward from the elements 910, 920, it will move first to the graphic 930a and thence to the submit button 940, potentially further increasing the likelihood that the user's attention will be drawn to the graphic 940.

In the foregoing examples, the verification data has been rendered for display in the same view or screen as the fields or elements intended to receive the inputted user credentials or other sensitive or private information. In an alternative embodiment, the verification data may be presented to the user in advance of the screen or view at which the user credentials are input. Turning to FIG. 9B, when data from the server 1000 is initially provided, a first resource configured to retrieve the verification file from local storage is provided, but without any input fields for receiving user credentials, as shown in the graphical user interface 900b. The user's attention is thus drawn to the rendering of the verification data from the verification file, illustrated in FIG. 9B by the graphic 930b, as it becomes a central object or perhaps the main object displayed to the user. In this embodiment, before any transaction with the server 1000 can be commenced, the user must select one of the user interface elements 950 or 960 to initiate a response to be transmitted to the server 1000 to indicate whether the verification data displayed is correct. If it is confirmed that the verification data is correct, then the user can proceed to submit credentials. This may involve the server 1000 transmitting a new resource to the client device 100 for receiving the user-inputted credentials upon receipt of the response indicating the verification data is correct. It should be noted that in the example of FIG. 9B, the step of confirming the authenticity of the verification data is disassociated from the input of user credentials, since a separate resource must be delivered to the client device 100 in response to the confirmation response.

Although the embodiments above were described generally in the context of a login page for an online service, such as a financial institution's online banking website, it will be appreciated by those skilled in the art that the processes above may be implemented in connection with other services, including e-commerce, social networking, and productivity services and websites. Further, the first and second resource retrieved need not necessarily comprise the same content. For example, the first resource may be provided by an online payment service to permit users to define and store their verification files, which will be accessible by resources originating from the online payment service and rendered at the client device 100. The online payment service may permit registered users to transfer funds between them, and may offer shopping cart modules for use third party online vendors.

Figures 10A, 10B:
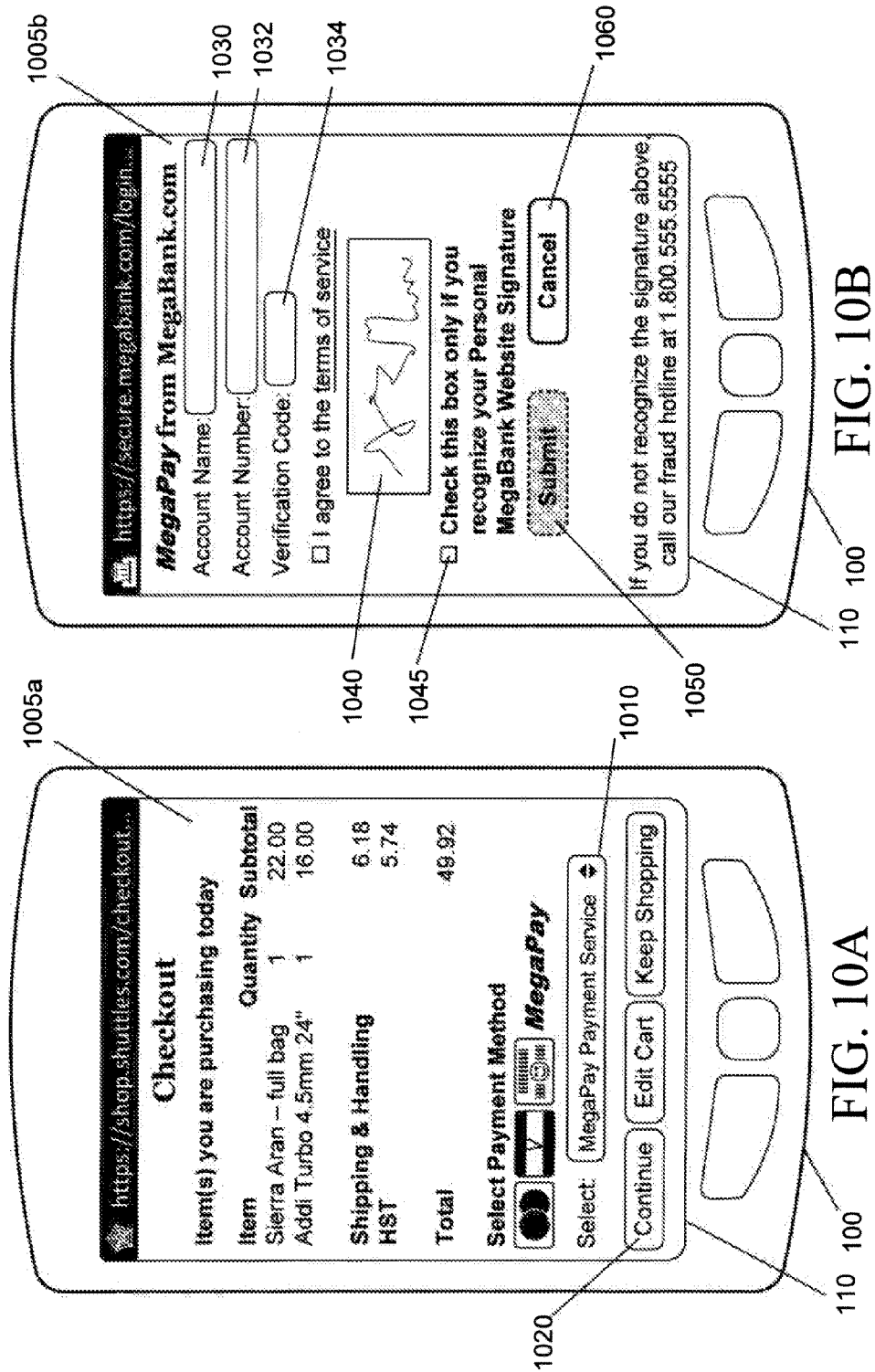
FIGS. 10A and 10B are further examples of graphical user interfaces displayable on a mobile communication device.

Subsequently, the user, while perusing a third-party website implementing the online payment service's shopping cart module, can initiate a purchase from the third party. In response to a request transmitted from the user's client browser or other application, a second, subsequent resource may be received from the online payment service, such as a "checkout" page for completing the purchase. The checkout page can include fields and other user interface elements for the user to enter and submit sensitive financial information, such as credit card numbers, userids, passwords, and card verification numbers of personal identification numbers. This subsequent resource can include a script or other executable instructions for retrieving the verification file from the client device 100's local storage, and rendering data from the verification file for display in a user interface. Since the subsequent resource is received from the same source as the online payment service used by the user to define the verification file, permission should be granted to access the verification file from the local storage. The accuracy of the verification data may then be visually confirmed by the user prior to completing the checkout procedure by submitting the financial information. Thus, the verification file previously set by the user in association with the online payment service, FIGS. 10A and 10B illustrate an example of the above embodiment. FIG. 10A illustrates a further example of a graphical user interface 1005a displayed on a mobile communication device is shown. Again, the examples of FIGS. 10A and 10B may be implemented on other client devices 100 and with different protocols. In FIG. 10A, a resource such as a "checkout" webpage served from a retailer's web server 1500 (not shown) is displayed. In addition to order details, the checkout page may provide the user with an option to select a payment method, such as credit or debit card, balance transfer, and the like. This is illustrated by the drop-down list element 1010. Once the user has selected a payment method and actuated the "continue" button 1020 (or otherwise invoked a command to submit the user's payment method choice to the retailer server 1500), the requested payment method is conveyed to the retailer's server 1500, which then initiates transmission of a subsequent page for obtaining payment details from the user.

If the retailer collects the user's payment details directly from the user, the subsequent page may be served from the retailer's web server 1500. However, the retailer may instead make use of a merchant service that permits customers to make online payments without requiring the customers to provide his or her financial information directly to the retailer. In that case, the subsequent page received at the client device 100 may be transmitted from the online payment server 1000 rendered as shown in the interface 1005b in FIG. 10B. The graphical user interface 1005b here includes elements such as text input fields 1030, 1032, 1034 for entry of customer account information for the online payment service. The account information can include an account identifier such as account or customer name, a userid, or the like, and additionally or alternatively an account number, as well as some form of authentication data such as a password, or a verification code or personal identification number (such as a card verification value or security code).

Similarly to FIG. 9A, the subsequent page delivered to the client device 100 is also configured to initiate an attempt at retrieving the verification file from the local storage at the device 100, if the verification file is available; or else alternatively the subsequent page may permit the user to set or reset the verification data as described above. Again, as with FIG. 9A, the retrieved verification data is rendered and displayed at 1040, proximate to the user input fields 1030, 1032, 1034 or the "submit" button 1050 or other user interface element for initiating submission of the customer account information to the server 1000, to increase the likelihood that the user will note its appearance. If no verification data is displayed, or if the representation displayed at 1040 is determined to be incorrect, the user can cancel the transaction by actuating the "cancel" user interface element 1060, which can transmit a response to either the online payment server 1000 or the web server 1500 indicating that the transaction has been aborted. Further, the resource may be rendered in the user interface 1005b such that the "submit" button 1050 is disabled (i.e., incapable of gaining focus and/or being actuated in the user interface) until the user expressly checks a checkbox 1045 or another user interface element to indicate that the rendered verification data 1040 is recognized as correct or legitimate.

If the user-entered account information is submitted to the server 1000, the payment may then be processed by the online payment service. Upon confirmation of completion of payment or approval of the payment at the online payment service, the server 1000 may transmit a payment notification to the retailer's web server 1500. The client device's browser may also be redirected back to the retailer's website. In this embodiment, the user may make use of the verification data previously established for the online payment service to verify the likely authenticity of the source of the payment page displayed in the user interface 1005b. In this way, there is no need for the user to commit to memory different verification information for each retailer website or other service accessed by the client device 100, provided each of these services makes use of the payment submission process described above.

Figure 11:
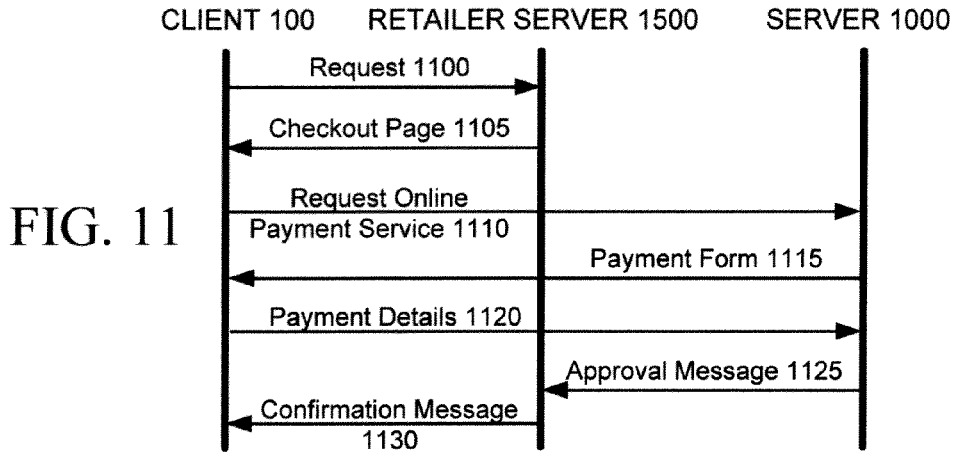
FIG. 11 is a schematic diagram of communication flow between a client device, a retailer server, and an online financial service server.

Communication flow in the above embodiment is illustrated in FIG. 11. In response to a request 1100 received from the client device 100, the retailer server 1500 transmits a checkout webpage 1105, as described above, to the client device 100. The checkout page can include an option to select a payment method, and in particular to select an online payment service offered via the server 1000. Once this selection has been made, the client device 100 transmits to the server 1000 a request 1110 indicating that the online payment service has been selected. This request 1110 can include purchase details such as item description, dollar amount, merchant identifier, order number, and other purchase information that may facilitate the transaction. In response to this request, the server 1000 transmits a payment form 1115 to be rendered at the client device 100 for user submission of payment details, such as a credit or debit card number, other account identifier, and password or other authentication code, and the like. This payment form 1115, as described above, includes the code or script which, when executed at the client device 100, attempts to retrieve a verification file from local storage associated with the origin of the payment form 1115, i.e., the server 1000, for rendering and display of verification data at the client device 100. If the verification data is confirmed by the user, the user may then input payment details, which are then transmitted in a response 1120 to the server 1000. After receipt of the payment details, the server 1000 may then process the payment, and provide an approval message 1125 to the retailer server 1500 confirming the payment has been made. The retailer server 1500 may then transmit a confirmation message 1130 (for example, a webpage confirming order details) to the client device 100.

The foregoing communication flow, as illustrated, omits other possible steps. For example, additional messages may be transmitted between the servers 1000, 1500 and the client device 100 during the course of the transaction. Further, not every message illustrated in FIG. 11 need be transmitted using the same protocols or channels. For example, the communications between the client device 100 and the retailer server 1500 or the server 1000 may be carried out using HTTP while the approval message 1125 and other messages passed between the servers 1000, 1500 are transmitted using another protocol.

Figure 12:
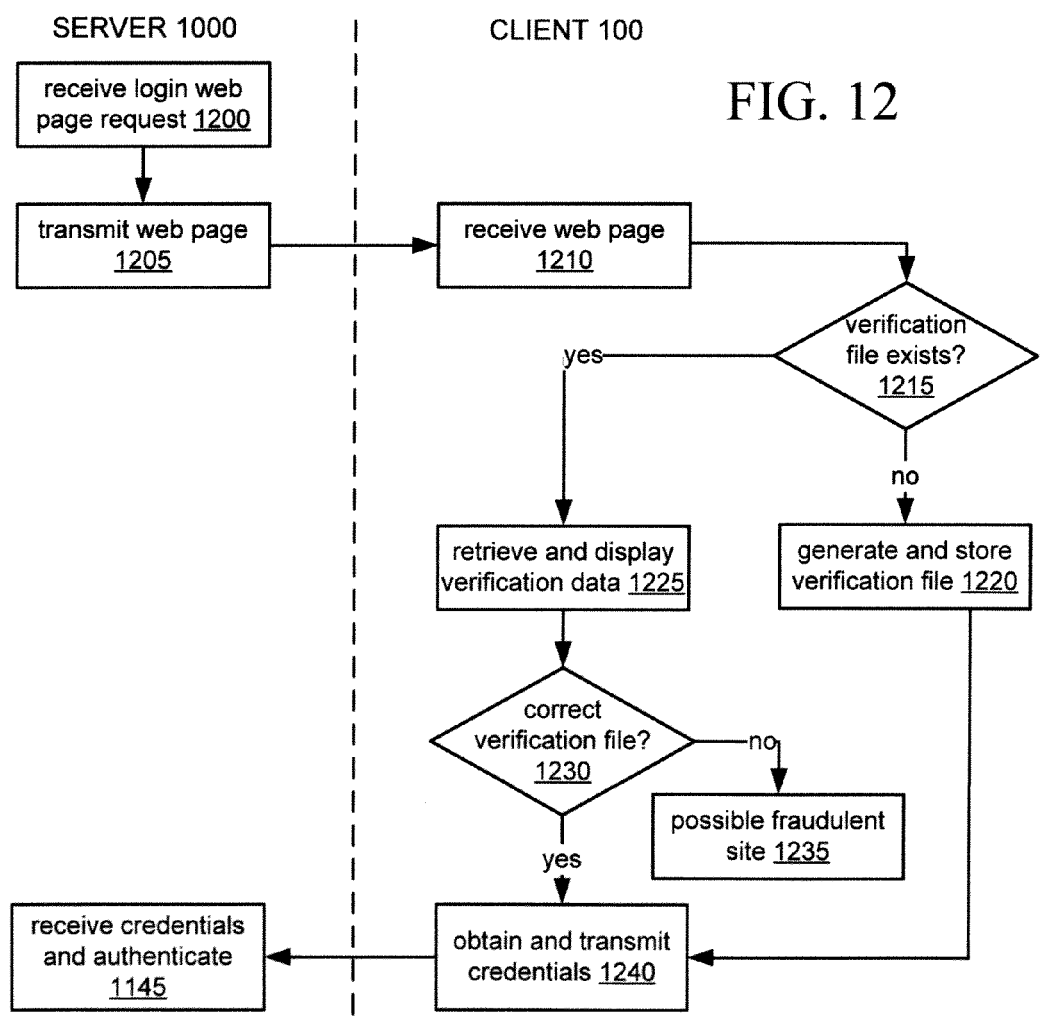
FIG. 12 is a further flowchart of a method for verifying a resource provided by a server.
Figure 15A:
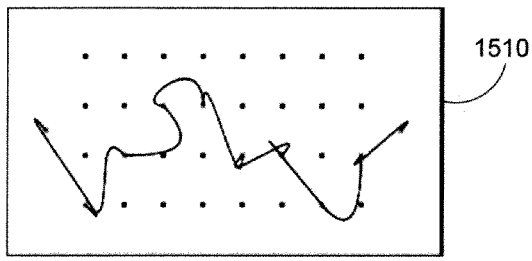
FIGS. 15A to 15D are examples of visual hash images.

The foregoing embodiments were described in the context of two separate resources (such as webpages 700 and 800*a*) transmitted to the client device 100, each resource comprising a separate script for either generating and saving, or retrieving and displaying, a verification file. These tasks may be merged in a single script or process. Turning to FIG. 12, an overview of a merged process is shown. At 1200, the server 1000 receives a request for a resource, such as a login webpage. At 1205 the requested resource is transmitted to the client device 100, and at 1210 the resource is received at the client device 100. The resource may comprise executable instructions or a script to determine first whether the resource is being displayed in a frame or iframe, or is being displayed in a mode that may be indicative of an attempt to "clickjack" the resource, in which user actions on elements in the resource (such as clicking buttons or entering data) are actually directed towards the attacker's own webpage, which may be displayed invisibly over the legitimate resource. The resource may then determine whether a verification file exists in local storage at the client device 100 at 1215. If no verification file exists, then at 1220 the process may generate new verification data and store in the local storage a new verification file comprising the verification data. The process may then move to 1240, where user credentials are obtained and transmitted over a network to the server 1000 for authentication at 1245.

If at 1215 it is determined that a verification file exists, then at 1225 the verification file is retrieved and the data comprised in the file is rendered and displayed. At 1230, a determination is made whether the verification file as presented at the device is the correct verification file. If the verification file is correct, then at 1240 user credentials may be received by the client device 100 and then transmitted to the server 1000 for authentication at 1245.

Thus, following the process of FIGS. 6 and 12, a first resource is accessed and a verification file is generated and stored. Subsequently, a second resource is accessed. If the second resource originates from the same source as the first resource accessed, then the second resource may be presumed to be legitimate. The first and second resources may be determined to originate from the same source through the use of the verification file; because it is accessible only to those resources originating from the same source, it follows that if the second resource is capable of retrieving and displaying the correct verification file to the user in a manner such that the resource is displayed as expected by the user, the second resource must have originated from the same source as the first resource. This solution does not require that the verification file be transmitted between the server 1000 and the client device 100, thus reducing a potential vulnerability to man-in-the-middle attacks.

The foregoing processes may be implemented using any suitable communication technologies and protocols. The processes of generating, storing, and retrieving the verification file may be carried out using any suitable programming language and libraries. As mentioned above, access to the verification files stored in local storage at the client device 100 may be restricted only to processes and resources that originate from the same source as the process or resource associated with the original generation of the verification file. A schematic diagram of the data that may be stored in the local storage is shown in FIG. 13. Local storage 1300, which may be resident in persistent memory at the client device 100, may comprise one or more sets of data 1310, 1320, 1330, each of which may be associated with a particular source or origin (indicated in FIG. 13 with the URIs such as "http://example1.com"). Each data set may comprise a key value 1312, 1322, 1332 such as "visualHashstore", and a corresponding value 1314, 1324, 1334 which may comprise the data object itself (i.e., the verification file), or a pointer to the verification file elsewhere in memory at the client device 100. Access to a data set 1310, 1320, 1330 may be restricted only to those processes or resources originating from the same origin as that associated with the data set. Thus, a webpage running a script received from http://example2.com may not access the data set stored in association with http://example1.com. In some embodiments, access to a data set may be restricted not only by origin (i.e., by hostname, such as "example1.com"), but also by port (e.g. verification files set by resources originating from http://example1.com may not be accessed by resources originating from https://example1.com). However, resources originating from a host within a related subdomain may be granted access to the same verification files (e.g. verification files set by resources originating from http://example1.com may be accessed by resources originating from http://example1.com/services). Further, although only a single key-value pair is illustrated in the data sets 1310, 1320, 1330, a data set may comprise further verification files for different resources originating from the same source. It will be appreciated by those skilled in the art that the representation of the data sets in FIG. 13 in tabular format are not intended to be limiting; the data comprised in the data sets 1310, 1320, 1330 may be stored in any other suitable format in the memory of the client device 100. In some embodiments, for example, no key value may be stored if the only file stored in association with a given origin is the verification file.

While these processes may be implemented using applets embedded in the resources delivered by the server 1000, in some embodiments these processes may be implemented using the DOM Storage features provided in the HTML5 specification, and in particular the localStorage attribute, which provides for the persistent storage of multiple data objects in association with a given origin. Unlike cookies, data stored as a localStorage object may be persisted across multiple browser sessions. The lifetime of the localStorage object may be unlimited, although the client browser may delete the contents of the local storage upon a received user command, or may automatically set the contents to expire after a predetermined time. Thus, the client device 100 would be provided with a client browser application implementing the Storage application programming interface specified in the HTML5 Web Storage draft specification. Use of the localStorage attribute will then restrict access to the localStorage object stored at the client device 100 to only those scripts and resources with an effective origin that is the same as the origin of the resource that caused the data to be stored in the localStorage object.

The verification file, when generated and stored as described above, is limited to a single client device 100. If the user moves to a different client device and attempts to access the same online service, the verification file will not be present, and the process of FIG. 12 will initiate the generation and storage of a new, different verification file at the new client device. Thus, in a further embodiment, the client device 100 may be configured to synchronize its data stores, including any data in the local storage 1300, with another client device. This synchronization may occur either directly between the two client devices, or alternatively through synchronization of the first client device 100 with a server or other synchronization device, such as a personal computer, and subsequent synchronization of the second client device with the server or other synchronization device.

An image file may be selected as the verification file, since login pages and other resources are generally displayed to a user in a graphical user interface, and visual inspection of an image may be carried out faster than inspection of a detailed block of text or other types of files. However, the verification file may be any type of suitable data that is capable of being presented to and perceived by the user at the client device 100, and in particular, capable of being perceived by the user in association with, or in proximity to, a password entry field, or some other interface element or subsystem used to collect confidential information from the user. For example, the verification file may comprise a text phrase, an image, a music or sound clip, or a movie or animation clip, which may be played back or displayed to the user at around the same time as the user is requested to supply his or her credentials for transmission to the server 1000. The verification file that is stored in the local storage at 1220 may be a file that is already present on the client device 100; for example, an interface in the resource displayed to the user at step 1210 of FIG. 12 may provide a file selection tool for the user to locate, optionally preview, and select a pre-existing file stored in the memory of the client device 100 as the verification file. The verification file may comprise a string of text, such as a memorable sentence or verse, which the user selects or inputs. This process is illustrated in FIG. 14A, where at 1405 the client device 100 receives an identification of a user-selected file, or receives an input from the user comprising data to be stored in the verification file, and at 1410 the file or input is stored in the local storage 1300 of FIG. 13.

As illustrated or described above in the embodiments of FIGS. 7, 8A, and 9A through 10B, the verification file may comprise a virtual hash image. A virtual hash image is an image generated from a seed value, which may be a random or quasi-random value, and according to any one of a number of suitable algorithms for generating a distinguishable graphic design. Referring to FIG. 14B, at 1415 a seed value is obtained. While the seed value may be random or quasi-random, it could optionally be derived using a current timestamp or other inputs (for example, values resulting for digitization of an input signal received via an input subsystem at the device due to the user manipulating the input subsystem). The seed value itself may be used to generate the visual hash, although a hash function could be applied to the seed value at 1420, and the hashed seed value used as input for the visual hash generation. A representation is then derived from the hash for display or presentation to the user at 1425. Optionally, the user can choose to regenerate the hash representation at 1430, and repeat steps 1415 through 1425 until a representation that the user wishes to select is generated. At 1435, the device 100 receives confirmation from the user that the currently presented representation is to be used (for example, by the user actuating the "save" button 750 in FIG. 7). The hash value In FIGS. 7, 8A, 9A, 9B and 10B, and also in FIGS. 15A to 15D, examples of visual hash images 730, 830, 930*a*, 930*b*, 1040, 1510, 1520, 1530, and 1540 generally resembling a written "signature" shape are shown. The general shape of the visual hash image may assist the user in recalling the image at a later time, as the path traced by the image is somewhat reminiscent of a person's written signature.

The visual hash images illustrated herein are generated from a predetermined number of bytes of random or quasi-random data extracted from the seed value or hashed seed value, to which an algorithm is applied to define tangents and Bezier curves to yield a wavy line. In the example of FIG. 15C, a fill command is applied around a midpoint of the line to define a solid shape or sequence of solid shapes. The visual hash image may be displayed against a background comprising grid points 1522 as indicated in FIG. 15B. The Bezier curves may be drawn on the background so as to connect select ones of the grid points 1522. Further, the grid points 1522 may be used as in the visual hash computation to assist the user in recognizing the shape represented by the image. Of course, the image may be shown without any background reference points, as in FIG. 15D.

The visual hash, thus computed, is then rendered in the display of the client device 100. If the user is not satisfied with the appearance of the visual hash thus displayed, the user may initiate an instruction to regenerate the visual hash at 1430. If the user is satisfied with the appearance of the representation of the visual hash, then the user may confirm the selection of that visual hash, and the client device 100 receives that confirmation at 1435. At 1440, the device 100 then stores either the seed value or hashed seed value, or alternatively the generated image, in the local storage at the device. If the resource comprising the visual hash image element is an HTML document, the image may be rendered using a canvas element when the document is displayed at the device 100. Thus, the device 100 need only store the seed value or the hashed seed value in the local storage, as the visual hash representation is regenerated each time the resource is rendered for display at the device 100. In other embodiments, the representation itself (e.g., the visual hash image) is stored in the local storage.

Using the process described in FIG. 12 above, the user may repeatedly re-seed the algorithm with different quasi-random values to generate an image that the user considers to be sufficiently memorable for use as a verification file. By generating a visual hash at the client device 100, a quasi-unique image may be generated that is available only to the client device 100, and which is less likely to be replicated by an attacker. Further, because the visual hash or other verification file is intended to be stored only at the client device 100, there is no need to share a secret with the server 1000, which may be intercepted; nor is there a need to correlate or coordinate images or values for generating images between the server 1000 and the client device 100. In addition, because the user is able to re-seed the visual hash (or other representation), and because the verification file thus generated and stored is maintained only locally at the client device 100, the ability to reset the verification file is within the user's control, and there is no need for the user to contact the operator of the server 1000 to obtain a change of password or identifier.

Figure 16A:
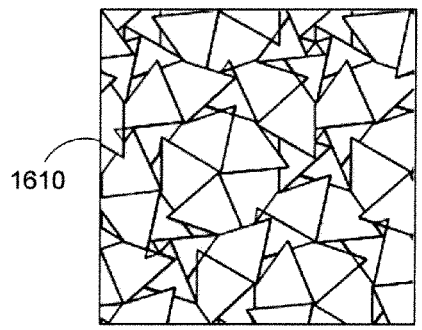
FIGS. 16A to 16C are examples of verification files.
Figure 16B:
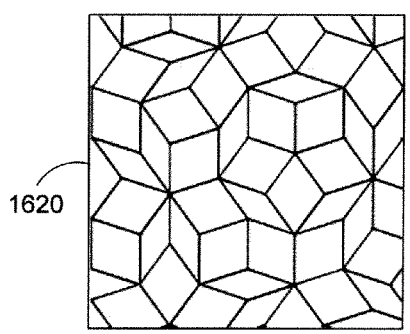

Other types of images may be generated in a manner similar to a visual hash. For example, geometric patterns may be generated based on random or quasi-random seed values, nonces, or other input values, such as the patterns 1610, 1620, 1630 shown in FIGS. 16A, 16B and 136, respectively. Similarly, sounds or text passages may be generated using the seed value or hashed seed value as input.

Thus, in accordance with the embodiments described herein, there is provided a client device comprising at least one transceiver configured to receive and transmit data over the network; local storage; and a processor, wherein the processor is configured to: enable receipt, over the network, of a resource comprising instructions for retrieving a verification file, the verification file being previously generated at the client device and stored in the local storage as a result of a process originating from an originating host, wherein access to the verification file is restricted to processes originating from the originating host; execute said instructions for retrieving the verification file; if the received resource is determined to originate from the originating host, enable retrieval of the verification file and rendering of the resource and the verification file thus retrieved for presentation via a user interface, wherein the received resource is determined to be authenticated when the rendering of said verification file corresponds to an expected rendering.

In an aspect of the client device, the resource comprises at least one user interface element for input of credentials, and the processor is further configured to enable transmission of credentials input using said at least one user interface over the network if the received resource is determined to be authenticated.

In another aspect, the resource further comprises at least one user interface element for initiating transmission of said input credentials over the network, and the processor is further configured to enable rendering of the verification file thus retrieved such that it is proximate to said at least one user interface element for initiating transmission.

In still another aspect, verification file comprises a seed value, and the processor is further configured to enable said rendering by generating a visual hash graphic using said seed value.

In yet a further aspect, the processor is further configured to enable display of an indication that the received resource may not be legitimate if the received resource is determined not to originate from the originating host.

The embodiments described herein further provide a method implemented at a client device, the method comprising receiving, over a network, a resource comprising instructions for retrieving a verification file, the verification file being previously generated at the client device and stored in memory local storage at the client device as a result of a process originating from an originating host, wherein access to the verification file is restricted to processes originating from the originating host; executing said instructions for retrieving the verification file; and if the received resource is determined to originate from the originating host, retrieving the verification file and rendering the resource and the verification file thus retrieved for presentation via a user interface, wherein the received resource is determined to be authenticated when the rendering of said verification file corresponds to an expected rendering.

In an aspect of the above method, the resource comprises at least one user interface element for input of credentials, the method further comprising transmitting credentials input using said at least one user interface over the network if the received resource is determined to be authenticated.

In another aspect, the resource further comprises at least one user interface element for initiating transmission of said input credentials over the network, and rendering the verification file thus retrieved comprises rendering the verification file such that it is proximate to said at least one user interface element for initiating transmission.

In yet another aspect, the verification file comprises a seed value, and rendering the verification file thus retrieved comprises generating a visual hash graphic using said seed value.

In a further aspect, if the received resource is determined not to originate from the originating host, the method provides for displaying an indication that the received resource may not be legitimate.

In further aspects of the client device and method, resource comprises a webpage and the originating host comprises a web server; the visual hash graphic resembles a written signature; and/or the resource comprises instructions executable at the client device for generating verification data for storage in the local storage. In still a further aspect, the instructions for retrieving the verification file are compliant with the HTML5 Web Storage specification, and the verification file is stored in an HTML5 local storage object in the local storage. Further, the client device may be a mobile communication device and the network may be a wireless network.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A client device comprising:
   at least one transceiver configured to receive and transmit data over a network;
   local storage coupled to the at least one transceiver; and
   a processor coupled to the at least one transceiver and the local storage, the processor configured to:
      enable receipt, over the network, of a resource comprising instructions for retrieving a verification file, the verification file being previously generated at the client device and stored in the local storage as a result of a process originating from an originating host, wherein access to the verification file is restricted to processes originating from the originating host;
      execute said instructions for retrieving the verification file;
      if the received resource is determined to originate from the originating host, enable retrieval of the verification file and rendering of the resource and the verification file thus retrieved for display via a user interface,
   wherein the received resource is determined to be authenticated when the verification file as displayed corresponds to an expected rendering.

2. The client device of claim 1, wherein the resource comprises at least one user interface element for input of credentials, and wherein the processor is further configured to enable transmission of credentials input using said at least one user interface over the network if the received resource is determined to be authenticated.

3. The client device of claim 1, wherein the resource further comprises at least one user interface element for initiating transmission of said input credentials over the network, and wherein the processor is further configured to enable rendering, for display, of the verification file thus retrieved such that it is proximate to said at least one user interface element for initiating transmission.

4. The client device of claim 1, wherein the verification file comprises a seed value, and wherein the processor is further configured to enable said rendering by generating a visual hash graphic using said seed value.

5. The client device of claim 4, wherein the visual hash graphic resembles a written signature.

6. The client device of claim 1, wherein the processor is further configured to enable display of an indication that the received resource may not be legitimate if the received resource is determined not to originate from the originating host.

7. The client device of claim 1, wherein the resource further comprises instructions executable at the client device for generating verification data for storage in the local storage.

8. The client device of claim 1, wherein the resource comprises a webpage and the originating host comprises a web server.

9. The client device of claim 8, wherein said instructions for retrieving the verification file are compliant with the HTML5 Web Storage specification, and the verification file is stored in an HTML5 local storage object in the local storage.

10. The client device of claim 1, wherein the client device is a mobile communication device.

11. A method implemented at a client device, the method comprising:
   receiving, over a network, a resource comprising instructions for retrieving a verification file, the verification file being previously generated at the client device and stored in local storage at the client device as a result of a process originating from an originating host, wherein access to the verification file is restricted to processes originating from the originating host;
   executing said instructions for retrieving the verification file; and
   if the received resource is determined to originate from the originating host, retrieving the verification file and rendering the resource and the verification file thus retrieved for display via a user interface,
   wherein the received resource is determined to be authenticated when the verification file as displayed corresponds to an expected rendering.

12. The method of claim 11, wherein the resource comprises at least one user interface element for input of credentials, the method further comprising transmitting credentials input using said at least one user interface over the network if the received resource is determined to be authenticated.

13. The method of claim 11, wherein the resource further comprises at least one user interface element for initiating transmission of said input credentials over the network, and further wherein rendering the verification file thus retrieved comprises rendering, for display, the verification file such that it is proximate to said at least one user interface element for initiating transmission.

14. The method of claim 11, wherein the verification file comprises a seed value, and rendering the verification file thus retrieved comprises generating a visual hash graphic using said seed value.

15. The method of claim 14, wherein the visual hash graphic resembles a written signature.

16. The method of claim 11, wherein if the received resource is determined not to originate from the originating host, displaying an indication that the received resource may not be legitimate.

17. The method of claim 11, wherein the resource further comprises instructions executable at the client device for generating verification data for storage in the local storage.

18. The method of claim 11, wherein the resource comprises a webpage and the originating host comprises a web server.

19. The method of claim 18, wherein said instructions for retrieving the verification file are compliant with the HTML5 Web Storage specification, and the verification file is stored in an HTML5 local storage object in the local storage.

20. The method of claim 11, wherein the client device is a mobile communication device and the network comprises a wireless network.

21. A non-transitory computer-readable medium comprising instructions executable by a microprocessor, wherein the instructions when executed configure the microprocessor to:
   receive, over a network, a resource comprising instructions for retrieving a verification file, the verification file being previously generated at a client device and stored in local storage at the client device as a result of a process originating from an originating host, wherein access to the verification file is restricted to processes originating from the originating host;

execute said instructions for retrieving the verification file; and if the received resource is determined to originate from the originating host, retrieve the verification file and render the resource and the verification file thus retrieved for display via a user interface, wherein the received resource is determined to be authenticated when the verification file as displayed corresponds to an expected rendering.

\* \* \* \* \*